United States Patent
Larsen et al.

(10) Patent No.: US 12,018,216 B2
(45) Date of Patent: *Jun. 25, 2024

(54) METHODS AND SYSTEMS FOR ENHANCING PROCESSING OF HYDROCARBONS IN A FLUID CATALYTIC CRACKING UNIT USING PLASTIC

(71) Applicant: MARATHON PETROLEUM COMPANY LP, Findlay, OH (US)

(72) Inventors: Nikolas A. Larsen, Findlay, OH (US); Jeffrey A. Sexton, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,818

(22) Filed: Jun. 16, 2023

(65) Prior Publication Data

US 2023/0332058 A1 Oct. 19, 2023

Related U.S. Application Data

(63) Continuation-in-part of application No. 18/045,314, filed on Oct. 10, 2022, now Pat. No. 11,692,141.
(Continued)

(51) Int. Cl.
C10G 47/36 (2006.01)
C10G 47/32 (2006.01)

(52) U.S. Cl.
CPC ............. *C10G 47/36* (2013.01); *C10G 47/32* (2013.01); *C10G 2300/4081* (2013.01); *C10G 2300/708* (2013.01); *C10G 2300/807* (2013.01)

(58) Field of Classification Search
CPC ............ C10G 47/32; C10G 47/36; C10G 2300/4081; C10G 2300/708; C10G 2300/807
See application file for complete search history.

(56) References Cited

U.S. PATENT DOCUMENTS 2,792,908 A 5/1957 Glanzer
2,804,165 A 8/1957 Blomgren
(Continued)

FOREIGN PATENT DOCUMENTS

AT 11772 U1 4/2011
CN 201264907 Y 7/2009
(Continued)

OTHER PUBLICATIONS

Bollas et al., "Modeling Small-Diameter FCC Riser Reactors. A Hydrodynamic and Kinetic Approach", Industrial and Engineering Chemistry Research, 41(22), 5410-5419, 2002.
(Continued)

*Primary Examiner* — Brian A McCaig
(74) *Attorney, Agent, or Firm* — Womble Bond Dickinson (US) LLP

(57) ABSTRACT

Systems and methods are disclosed for enhancing the processing of hydrocarbons in a FCC unit by introduction of fluidized plastic at one or more locations of the FCC unit. In an embodiment, the method may include passing a coked FCC catalyst from a cyclone of the FCC unit to a regenerator. The method may include introducing at least oxygen and a fluidized plastic into the regenerator. The method may include combusting a combination of the fluidized plastic and a coke from the coked FCC catalyst in the regenerator, thereby to oxidize via the oxygen and produce a regenerated FCC catalyst and a flue gas. The method may include supplying the regenerated FCC catalyst from the regenerator to a riser of the FCC unit to crack the gas oil supplied to the riser of the FCC unit.

29 Claims, 6 Drawing Sheets

Related U.S. Application Data

(60) Provisional application No. 63/495,761, filed on Apr. 12, 2023, provisional application No. 63/495,748, filed on Apr. 12, 2023, provisional application No. 63/378,981, filed on Oct. 10, 2022, provisional application No. 63/262,342, filed on Oct. 10, 2021.

(56) References Cited

U.S. PATENT DOCUMENTS

| | | |
|---|---|---|
| 2,867,913 A | 1/1959 | Faucher |
| 2,925,144 A | 2/1960 | Kroll |
| 3,901,951 A * | 8/1975 | Nishizaki ............... C10B 49/10 521/40.5 |
| 4,066,425 A | 1/1978 | Nett |
| 4,217,116 A | 8/1980 | Seever |
| 5,115,686 A | 5/1992 | Walker et al. |
| 5,302,294 A | 4/1994 | Schubert |
| 5,415,025 A | 5/1995 | Bartman et al. |
| 5,443,716 A | 8/1995 | Anderson et al. |
| 5,446,681 A | 8/1995 | Gethner et al. |
| 5,516,969 A | 5/1996 | Krasznai et al. |
| 5,540,893 A | 7/1996 | English |
| 6,258,987 B1 | 7/2001 | Schmidt et al. |
| 7,194,369 B2 | 3/2007 | Lundstedt et al. |
| 7,682,501 B2 | 3/2010 | Soni et al. |
| 7,931,803 B2 | 4/2011 | Buchanan |
| 7,932,424 B2 | 4/2011 | Fujimoto et al. |
| 7,981,361 B2 | 7/2011 | Bacik |
| 8,518,131 B2 | 8/2013 | Mattingly et al. |
| 8,569,068 B2 | 10/2013 | Carpenter et al. |
| 8,753,502 B1 | 6/2014 | Sexton et al. |
| 8,829,258 B2 | 9/2014 | Gong et al. |
| 8,999,012 B2 | 4/2015 | Kelly et al. |
| 9,109,177 B2 | 8/2015 | Freel et al. |
| 9,279,748 B1 | 3/2016 | Hughes et al. |
| 9,428,695 B2 | 8/2016 | Narayanaswamy et al. |
| 9,662,597 B1 | 5/2017 | Formoso |
| 9,663,729 B2 | 5/2017 | Baird et al. |
| 9,789,290 B2 | 10/2017 | Forsell |
| 9,925,486 B1 | 3/2018 | Botti |
| 10,384,157 B2 | 8/2019 | Balcik |
| 10,435,339 B2 | 10/2019 | Larsen et al. |
| 10,479,943 B1 | 11/2019 | Liu et al. |
| 10,563,130 B2 | 2/2020 | Narayanaswamy et al. |
| 10,570,078 B2 | 2/2020 | Larsen et al. |
| 10,640,719 B2 | 5/2020 | Freel et al. |
| 11,164,406 B2 | 11/2021 | Meroux et al. |
| 11,214,741 B2 | 1/2022 | Davydov et al. |
| 11,306,253 B2 | 4/2022 | Timken et al. |
| 11,319,262 B2 | 5/2022 | Wu et al. |
| 11,421,162 B2 | 8/2022 | Pradeep et al. |
| 11,578,638 B2 | 2/2023 | Thobe |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr. |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr. et al. |
| 11,920,096 B2 | 3/2024 | Woodchick et al. |
| 11,921,035 B2 | 3/2024 | Bledsoe, Jr. et al. |
| 11,970,664 | 4/2024 | Larsen |
| 2004/0139858 A1 | 7/2004 | Entezarian |
| 2005/0143609 A1 | 6/2005 | Wolf et al. |
| 2005/0229777 A1 | 10/2005 | Brown |
| 2006/0091059 A1 | 5/2006 | Barbaro |
| 2007/0112258 A1 | 5/2007 | Soyemi et al. |
| 2008/0087592 A1 | 4/2008 | Buchanan |
| 2010/0166602 A1 | 7/2010 | Bacik |
| 2010/0318118 A1 | 12/2010 | Forsell |
| 2012/0222550 A1 | 9/2012 | Ellis |
| 2012/0272715 A1 | 11/2012 | Kriel et al. |
| 2013/0112313 A1 | 5/2013 | Donnelly et al. |
| 2013/0192339 A1 | 8/2013 | Kriel et al. |
| 2014/0041150 A1 | 2/2014 | Sjoberg |
| 2014/0121428 A1 | 5/2014 | Wang et al. |
| 2014/0316176 A1 | 10/2014 | Fjare et al. |
| 2015/0005547 A1 | 1/2015 | Freel et al. |
| 2015/0005548 A1 | 1/2015 | Freel et al. |
| 2015/0034570 A1 | 2/2015 | Andreussi |
| 2015/0166426 A1 | 6/2015 | Wegerer et al. |
| 2015/0240167 A1 | 8/2015 | Kulprathipanja et al. |
| 2015/0337207 A1 | 11/2015 | Chen et al. |
| 2016/0045918 A1 | 2/2016 | Lapham |
| 2016/0090539 A1 | 3/2016 | Frey et al. |
| 2016/0168481 A1 | 6/2016 | Ray et al. |
| 2016/0175749 A1 | 6/2016 | Suda |
| 2016/0244677 A1 | 8/2016 | Froehle |
| 2016/0312127 A1 | 10/2016 | Frey et al. |
| 2017/0151526 A1 | 6/2017 | Cole |
| 2017/0269559 A1 | 9/2017 | Trygstad |
| 2018/0371325 A1 | 12/2018 | Streiff et al. |
| 2020/0041481 A1 | 2/2020 | Burgess |
| 2020/0181502 A1 | 6/2020 | Paasikallio et al. |
| 2020/0246743 A1 | 8/2020 | Sorensen |
| 2020/0316513 A1 | 10/2020 | Zhao |
| 2021/0103304 A1 | 4/2021 | Fogarty et al. |
| 2021/0213382 A1 | 7/2021 | Cole |
| 2021/0301210 A1 | 9/2021 | Timken et al. |
| 2022/0041940 A1 * | 2/2022 | Pradeep ............... C10G 11/182 |
| 2022/0299170 A1 | 9/2022 | Raynor et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0078852 A1 | 3/2023 | Campbell et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |
| 2024/0115996 A1 | 4/2024 | Rudd |
| 2024/0117262 A1 | 4/2024 | Eller |
| 2024/0118194 A1 | 4/2024 | Bledsoe, Jr. |
| 2024/0124790 A1 | 4/2024 | Sexton |
| 2024/0132786 A1 | 4/2024 | Sexton |

FOREIGN PATENT DOCUMENTS

| | | |
|---|---|---|
| CN | 111336612 A | 6/2020 |
| CN | 213824075 U | 7/2021 |
| CN | 215263512 U | 12/2021 |
| CN | 215288592 | 12/2021 |
| DE | 102014009231 A1 | 1/2016 |
| EP | 1870153 | 12/2007 |
| EP | 3878926 | 9/2021 |
| FR | 2357630 | 2/1978 |
| WO | 94/08225 | 4/1994 |
| WO | 2002038295 | 5/2002 |
| WO | 2010/144191 | 12/2010 |
| WO | 2012062924 | 5/2012 |
| WO | 2017207976 | 12/2017 |
| WO | 2018017664 | 1/2018 |
| WO | 2020035797 | 2/2020 |
| WO | 2022149501 | 7/2022 |
| WO | 20220144495 | 7/2022 |
| WO | 2022219234 | 10/2022 |
| WO | 2022220991 | 10/2022 |
| WO | 2023038579 | 3/2023 |
| WO | 2023137304 | 7/2023 |

(56) References Cited

FOREIGN PATENT DOCUMENTS

| WO | 2023164683 | 8/2023 |
|---|---|---|
| WO | 2023242308 | 12/2023 |

OTHER PUBLICATIONS

Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.
"Development of Model Equations for Predicting Gasoline Blending Properties", Odula et al., American Journal of Chemical Engineering, vol. 3, No. 2-1, 2015, pp. 9-17.
Lloyd's Register, Using technology to trace the carbon intensity of sustainable marine fuels, Feb. 15, 2023.
Andrea De Rezende Pinho et al., Fast pyrolysis oil from pinewood chips co-processing with vacuum gas oil in an FCC unit for second generation fuel production, Fuel 188 (2017) 462-473.
Passamonti, Francisco J. et al., Recycling of waste plastics into fuels. LDPE conversion in FCC, Applied Catalysis B: Environmental 125 (2012) 499-506.
Rodriguez, Elena et al., Coke deposition and product distribution in the co-cracking of waste polyolefin derived streams and vacuum gas oil under FCC unit conditions, Fuel Processing Technology 192 (2019) 130-139.
Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344 (Year: 2011).
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.

\* cited by examiner

METHODS AND SYSTEMS FOR ENHANCING PROCESSING OF HYDROCARBONS IN A FLUID CATALYTIC CRACKING UNIT USING PLASTIC

CROSS-REFERENCE TO RELATED APPLICATIONS

The present application claims priority to and the benefit of U.S. Provisional Application No. 63/378,981, filed Oct. 10, 2022, titled "METHODS AND SYSTEMS FOR ENHANCING PROCESSING OF HYDROCARBONS IN A FLUID CATALYTIC CRACKING UNIT USING A RENEWABLE ADDITIVE," U.S. Provisional Application No. 63/495,761, filed Apr. 12, 2023, titled "METHODS AND SYSTEMS FOR ENHANCING PROCESSING OF HYDROCARBONS IN A FLUID CATALYTIC CRACKING UNIT USING PLASTIC," and U.S. Provisional Application No. 63/495,748, filed Apr. 12, 2023, titled "METHODS AND SYSTEMS FOR ENHANCING PROCESSING OF HYDROCARBONS IN A FLUID CATALYTIC CRACKING UNIT USING A RENEWABLE ADDITIVE," the disclosures of which are incorporated herein by reference in their entirety. This application is also a continuation-in-part of U.S. Non-Provisional application Ser. No. 18/045,314, filed Oct. 10, 2022, titled "METHODS AND SYSTEMS FOR ENHANCING PROCESSING OF HYDROCARBONS IN A FLUID CATALYTIC CRACKING UNIT USING A RENEWABLE ADDITIVE," which claims priority to and the benefit of U.S. Provisional Application No. 63/262,342, filed Oct. 10, 2021, titled "METHODS AND SYSTEMS FOR ENHANCING PROCESSING OF HYDROCARBONS IN A FLUID CATALYTIC CRACKING UNIT USING A RENEWABLE ADDITIVE," the disclosures of which are incorporated herein by reference in their entirety.

TECHNICAL FIELD

This disclosure relates to systems and methods for enhancing the processing of hydrocarbons in a fluid catalytic cracking (FCC) unit by introduction of a plastic or fluidized plastic to the FCC regenerator and/or one or more other locations in the FCC unit. The disclosure relates to the addition of certain specific plastics, such as fluidized plastic, as an additive to the FCC regenerator and/or one or more other locations in the FCC unit.

BACKGROUND

FCC units are used in refining operations to produce gasoline and distillate fuels from higher molecular weight hydrocarbons. A catalytic FCC unit has two main components—a reactor and a regenerator. Severe hydroprocessing of FCC feedstock, which is utilized to meet gasoline sulfur specifications, can result in low FCC regenerator temperatures, low delta coke, and become an obstacle or constraint to unit optimization and refinery profitability. Several process variables can be changed to impact FCC regenerator temperature and formation of delta coke, but historically the ability to incorporate alternative feedstocks in response to this constraint has been limited. Traditional refinery streams/components that ameliorate low regenerator temperature are typically higher in sulfur or other contaminants that make processing of additives in the FCC unfavorable.

SUMMARY

Provided here are systems and methods to address these shortcomings of the art and provide other additional or alternative advantages. The disclosure herein provides one or more embodiments of systems and methods for enhancing the processing of hydrocarbons in a FCC unit by introduction of plastic to the FCC regenerator. In certain embodiments, the plastic provided as an additive to the FCC regenerator contains recycled plastic. Plastic may be used to debottleneck refinery FCC constraints and optimize refinery profitability, while also reducing plastic waste which would otherwise be landfilled or be sent to a landfill. Design modifications are provided for new and/or existing FCC regenerators to enhance the throughput of hydrocarbons processed in a FCC unit therefrom, which may be used independently or in various combinations. Such systems and methods, when used in combination, may advantageously provide for consumption of plastic in a FCC unit, decrease the energy consumption of a FCC regenerator, and increase FCC unit and refinery profitability.

In certain embodiments, the processing of hydrocarbons in a FCC unit is enhanced by first introducing gas oil and steam into the riser of a FCC unit. The gas oil and steam are mixed with a catalyst that is fluidized in the riser. The gas oil is cracked into one or more FCC products in the presence of the catalyst and the steam, which causes one or more surfaces of the catalyst to be at least partially covered by coke. The coked FCC catalyst is separated from the FCC products in one or more cyclones of the FCC unit. The one or more cyclones can be positioned in an upper portion of the FCC unit. The coked FCC catalyst from the reactor of the FCC unit is passed (for example, via the one or more cyclones) to a regenerator. Oxygen and/or air and plastic may be introduced into the regenerator to facilitate the combustion of the plastic and coke from the coked FCC catalyst. Through such combustion, the plastic and coke are oxidized by the oxygen (and/or, in some embodiments, oxygen in supplied air), and the catalyst is thus regenerated. This regenerated catalyst is returned from the regenerator to the riser of the FCC unit. In certain embodiments, the introduction of the plastic allows for a controlled increase in temperature, for example an increase of the temperature inside the regenerator by at least about 5 degrees Fahrenheit (° F.) (about −15° C.), by at least about 10° F. (about −12° C.), or even by at least 15° F. (about −9° C.), without adversely affecting properties of the FCC products. For example, the sulfur specifications of the FCC products are maintained. The use of the plastic waste can also increase the temperature inside the regenerator while maintaining sulfur specification of gasoline in the FCC products below a pre-selected value. This temperature increase can range from at least about 5° F. to about 25° F. or, in some embodiments, even greater. More than 90% of the sulfur content, but generally less than 50% of the total gasoline supply, is contributed by heavier feeds, which are cracked in the FCC. Current maximum gasoline sulfur limits vary widely from 10 ppm to 2,500 ppm depending on the location. The sulfur content of the various FCC products can vary from about 0.01 weight percent to about 4.5 weight percent, or, in some embodiments, even less than 0.01 weight percent. Certain products, such as ultra-low sulfur diesel, low sulfur vacuum gas oil, and low sulfur heavy fuel oils, have a sulfur content less than about 0.5 weight percent. Certain products, such as GVL slurry and heavy sulfur vacuum gas oil, have a sulfur content from about 1 weight percent to about 2 weight percent. Certain products, such as heavy sulfur heavy fuel oil and asphalt, have a sulfur content from about 3 weight percent to about 4.5 weight percent.

In certain embodiments, a method of processing a gas oil in a fluid catalytic cracking (FCC) unit may include passing a coked FCC catalyst to a regenerator. The method may include introducing at least oxygen and a fluidized plastic into the regenerator. The method may include combusting (via oxidation by oxygen) a combination of the fluidized plastic and coke found on the coked FCC catalyst in the regenerator, thereby producing a regenerated FCC catalyst and a flue gas. The method may include supplying the regenerated FCC catalyst from the regenerator to a riser of the FCC unit to facilitate cracking the gas oil supplied to the riser of the FCC unit.

In embodiments, the fluidized plastic may comprise a density of about 0.8 g/cm3 to about 1.0 g/cm3. The fluidized plastic may comprise or include one or more of polypropylene, low-density polyethylene, or high-density polyethylene. The fluidized plastic may comprise or include granules milled to one of a size of about the FCC catalyst or about 1 micrometer to about 350 micrometers, about 80 microns, or about 50 micron to about 100 microns. In an embodiment, the fluidized plastic may comprise a plastic substantially free from contaminates, such as sulfur, nitrogen, and/or chlorine, among other contaminants that may cause corrosion, fouling, scale, coking, and/or other issues downstream of the FCC unit.

In embodiments, introduction of the fluidized plastic into the regenerator may occur at one or more inlets of the regenerator.

In embodiments, the method may further include determining a temperature within the regenerator. The method may include determining a temperature within the riser of the FCC unit. The method may include, in response to a determination that one or more of (a) the temperature within the regenerator or (b) the temperature within the riser of the FCC unit, exceeds or falls below a corresponding threshold range, one or more of: (a) adjusting the amount of fluidized plastic introduced into the regenerator, (b) adjusting the amount of regenerated FCC catalyst supplied to the riser, or (c) introducing a second amount of fluidized plastic into one or more inlets of the reactor.

In embodiments, the method may include determining a yield of a specified hydrocarbon product produced via the FCC unit. The method may include, in response to a determination that the yield falls below a selected threshold, one or more of (a) adjusting the amount of fluidized plastic introduced into the regenerator, (b) adjusting the amount of regenerated FCC catalyst supplied to the riser, or (c) introducing a second amount of fluidized plastic into one or more locations of the reactor.

In another embodiment, the method may include, prior to introduction of the plastic waste into the regenerator, milling the plastic to a selected size, wherein the selected size comprises one or more of a size within about 5%, about 10%, about 20%, or even about 30% of the size of the FCC catalyst or about 1 micrometer to about 350 micrometer, about 80 microns, or about 50 micron to about 100 microns. In an embodiment, the plastic waste may comprise a plastic substantially free from contaminates, such as sulfur, nitrogen, and/or chlorine, among other contaminants that may cause corrosion, fouling, scale, coking, and/or other issues downstream of the FCC unit.

Another embodiment of the disclosure is directed to a method of processing a gas oil in a fluid catalytic cracking (FCC) unit. The method may include introducing the gas oil and steam into a riser of a FCC unit. The method may include mixing the gas oil and the steam with a FCC catalyst fluidized in the riser. The method may include cracking the gas oil into one or more FCC hydrocarbon products in the FCC unit, thereby to cause one or more surfaces of the FCC catalyst to be at least partially covered by coke so as to define a coked FCC catalyst. The method may include separating the coked FCC catalyst from the one or more FCC hydrocarbon products, for example, in one or more cyclones of the FCC unit. The method may include passing the coked FCC catalyst from the FCC unit or from another location of a reactor (for example, from the one or more cyclones of the FCC unit) of the FCC unit to a regenerator. The method may include introducing at least oxygen and a fluidized plastic into the regenerator. The method may include combusting (via oxidation by oxygen) a combination of the fluidized plastic and the coke found on the coked FCC catalyst in the regenerator, thereby producing a regenerated FCC catalyst and a flue gas. The method may include supplying the regenerated FCC catalyst from the regenerator to the riser of the FCC unit.

In an embodiment, combusting the fluidized plastic in the regenerator may allow a temperature inside the regenerator to be increased without adversely affecting one or more properties of the one or more FCC hydrocarbon products. Combusting the fluidized plastic in the regenerator may increase temperature inside the regenerator by at least about 5° F. (about −15° C.), by at least about 10° F. (about −12° C.), or even by at least 15° F. (about −9° C.), while maintaining one or more of (a) sulfur specifications of the one or more FCC hydrocarbon products or (b) specification of gasoline in the one or more FCC hydrocarbon products below a pre-selected value.

In embodiments, the method may include introducing the fluidized plastic at one or more of (a) proximate to a bottom portion of the regenerator or (b) a bed of catalyst positioned inside the regenerator.

The fluidized plastic may comprise or include a density of about 0.8 g/cm$^3$ to about 1.0 g/cm$^3$, wherein the fluidized plastic comprises one or more of polypropylene, low-density polyethylene, or high-density polyethylene, and wherein the fluidized plastic comprises granules milled to one of a size of about the FCC catalyst or about 1 micrometer to about 350 micrometers, about 80 microns, or about 50 micron to about 100 microns. In some embodiments, based on the type or types of plastic utilized, the location that the fluidized plastic is injected into, and/or the type of gas oil injected into the reactor or FCC unit, the fluidized plastic may be larger than about 350 micrometers. In another embodiment, the fluidized plastic may comprise a plastic substantially free from contaminates, such as sulfur, nitrogen, and/or chlorine, among other contaminants that may cause corrosion, fouling, scale, coking, and/or other issues downstream of the FCC unit.

In embodiments, the method may include determining, via a controller, a temperature within the regenerator. The method may include, in response to a determination that the temperature within the regenerator is less than a preselected temperature, adjusting, via a flow control device associated with the fluidized plastic and in communication with the controller, an amount of the fluidized plastic introduced into the regenerator to thereby adjust the temperature within the regenerator.

Another embodiment of the disclosure is directed to a method of processing a gas oil in a fluid catalytic cracking (FCC) unit. The method may include introducing the gas oil and steam into a riser of a FCC unit. The method may include mixing the gas oil and the steam with a FCC catalyst fluidized in the riser. The method may include injecting an amount of fluidized plastic into one or more locations of the FCC unit at one or more time periods to one or more of (a) balance heat within the FCC unit or (b) optimize a one or more FCC hydrocarbon products yield. The method may include cracking the gas oil into the one or more FCC hydrocarbon products in the FCC unit, thereby to cause one or more surfaces of the FCC catalyst to be at least partially covered by coke so as to define a coked FCC catalyst. The method may include separating the coked FCC catalyst from the one or more FCC hydrocarbon products in one or more cyclones of the FCC unit. The method may include passing the FCC hydrocarbon products (for example, from the one or more cyclones of the FCC unit) to an outlet.

In embodiments, injection of the fluidized plastic into the one or more locations of the FCC unit may comprise or include injection of the fluidized plastic at one or more of: (a) a regenerator, (b) the riser, (c) an FCC reactor catalyst bed, (d) an FCC catalyst stripper, (e) at a nozzle located above a gas oil injection point, or (f) at a nozzle located below the gas oil injection point, such that adjustment of an amount of fluidized plastic injected at any one of the one or more locations changes one or more of (a) the temperature within the FCC unit, such as the reactor and/or the regenerator, and (b) yield selectivity.

In embodiments, injection of the fluidized plastic may occur via an existing inlet of the FCC unit. The existing inlet may comprise one or more of a pre-stripping steam inlet, a stripping steam inlet, or a fluffing steam inlet. In an embodiment, the inlet may be selected based on an amount and/or type of fluidized plastic utilized.

In embodiments, the fluidized plastic may comprise or include a density of about 0.8 g/cm$^3$ to about 1.0 g/cm$^3$. The fluidized plastic may comprise one or more of polypropylene, low-density polyethylene, or high-density polyethylene. The fluidized plastic may comprise or include milled granules at a size about a size of the FCC catalyst, such as, within 5%, within 10%, within 20%, or even within 30% of the size of the FCC catalyst.

In embodiments, injection of the fluidized plastic into the one or more locations of the FCC unit may generate selective yields of specified hydrocarbon products. The selective yields of specified hydrocarbon products may comprise one or more of a reduction of hydrogen generation, an increase in C4 olefinicities, or a reduction in coke yield. The specified hydrocarbon products may include one or more of propylene, light olefins, transportation fuel, or other petrochemical feedstock.

In embodiments, injection of the fluidized plastic within the regenerator may increase temperature within the regenerator and thereby increase the temperature of regenerated FCC catalyst.

In an embodiment, the type of fluidized plastic selected, as well as the quality of the fluidized plastic, may affect delta coke. Further, the location that the fluidized plastic is injected into the FCC unit may impact delta coke as well. Delta coke is a ratio of coke yield per a catalyst to oil (cat/oil) ratio. Delta coke may also be determined based on a weight or mass of regenerated catalyst transported from the regenerator to the reactor subtracted from the weight or mass of the coked catalyst being transferred from the reactor to the regenerator. Thus, for example, as the cat/oil ratio increases, delta coke decreases.

For example, a fluidized plastic may be injected into the reactor of the FCC unit. In such examples, depending on the quality of the fluidized plastic (in other words, the amount of contaminants in the fluidized plastic) the delta coke may decrease or may not change in relation to delta coke levels prior to introduction of the fluidized plastic in the FCC unit, and, in some in embodiments, the delta coke may even increase (for example, injection of fluidized plastic into the stripper may increase delta coke).

In another example, the fluidized plastic may be added to the regenerator. Such an addition may increase the temperature within the regenerator. Further, due to the increased temperature more coke may be burned from the coked catalyst, as such, injection of renewable feedstock into the regenerator may increase the difference between the mass of coked catalyst entering the regenerator compared to the mass of regenerated catalyst leaving the regenerator, thus increasing the delta coke. In yet another example, the injection of fluidized plastic into the regenerator may not change delta coke.

In embodiments, the one or more locations of the FCC unit where fluidized plastic may be injected into the FCC unit may comprise or include a regenerator. Further, the method may include passing the coked FCC catalyst (for example, from the one or more cyclones of the FCC unit) to the regenerator. The method may include introducing at least oxygen and the fluidized plastic into the regenerator. The method may include combusting a combination of the fluidized plastic and the coke at least partially covering the coked FCC catalyst in the regenerator, to produce a regenerated FCC catalyst and a flue gas. The method may include supplying the regenerated FCC catalyst from the regenerator to the riser of the FCC unit.

In embodiments, the method may include determining, via a controller responsive to a sensor or analyzer positioned at one or more of within the FCC unit, at the outlet of the FCC unit, or in communication (for example, fluid, thermal, or electrical communication) with the outlet of the FCC unit, one or more of a conversion, yield, or selectivity. The method may include, in response to a determination that one or more of the conversion, yield, or selectivity are less than a preselected amount, adjusting an amount of the fluidized plastic injected into the FCC unit at the one or more alternative locations.

Another embodiment of the disclosure is directed to a method of processing a gas oil in a fluid catalytic cracking (FCC) unit to increase yield selectivities. The method may include introducing the gas oil, a first amount of fluidized plastic, and steam into a riser of a FCC unit. The method may include mixing the gas oil, the first amount of fluidized plastic, and the steam with a catalyst fluidized in the riser. The method may include injecting a second amount of fluidized plastic into one or more alternative locations of the FCC unit. The method may include cracking the gas oil and one or more of: (1) a portion of the first amount of fluidized plastic or (2) a portion of the second amount of fluidized plastic into one or more hydrocarbon products in the FCC unit, thereby to cause one or more surfaces of the catalyst to be at least partially covered by coke so as to define a coked catalyst. The method may include separating the coked catalyst from the one or more hydrocarbon products in one or more cyclones positioned in an upper portion of the FCC unit. The method may include passing the one or more hydrocarbon products to an outlet of the FCC unit. In another embodiment, a third amount of fluidized plastic may be injected into the regenerator.

In embodiments, the method may include passing the coked catalyst and an amount of unconverted fluidized plastic (for example, from the one or more cyclones of the FCC unit) to a regenerator. In such embodiments, the remaining fluidized plastic may be deposited onto the coked catalyst, along with coke, for example, when the fluidized plastic polymerizes about, hardens onto, or otherwise becomes attached to the coked catalyst. The method may include introducing oxygen into the regenerator. The method may include combusting the coke at least partially covering the coked catalyst and the amount of unconverted fluidized plastic in the regenerator to produce a regenerated catalyst and a flue gas. The method may include returning the regenerated catalyst from the regenerator to the riser of the FCC unit.

In embodiments, the method may include determining a temperature within the regenerator. The method may include, in response to a determination that the temperature within the regenerator is outside of a threshold, introducing a third amount of fluidized plastic into the regenerator for combustion with the coke found on the coked catalyst and the amount of unconverted fluidized plastic in the regenerator, also found on the coked catalyst. For example, the remaining fluidized plastic may be deposited onto the coked catalyst, along with coke, for example, when the fluidized plastic polymerizes about, hardens onto, or otherwise becomes attached to the coked catalyst.

In embodiments, the fluidized plastic may comprise or include plastic granules milled from one of plastic waste or post-consumer plastic waste.

In embodiments, addition of the first amount of fluidized plastic and the second amount of fluidized plastic may decreases hydrogen transfer activity and increases higher C4 olefinicities and reduces COx, SOx and nitric oxide emissions.

Another embodiment of the disclosure is directed to a system for processing a gas oil in a fluid catalytic cracking (FCC) unit. The system may include a riser having a first inlet to receive a gas oil stream, a second inlet to receive steam, and a third inlet to receive a FCC catalyst, the riser configured to be operated under cracking reaction pressure and temperature conditions to facilitate mixing and catalytic cracking of the gas oil stream in presence of the steam and the FCC catalyst to form a plurality of FCC products and coked FCC catalyst. The system may include a reactor having (a) a FCC reaction zone in fluid communication with an upper portion of the riser and configured to continue to crack the gas oil stream in presence of the steam and the FCC catalyst to thereby generate the plurality of FCC products and more of the coked FCC catalyst, (b) a separation zone to separate the plurality of FCC products from the coked FCC catalyst, and (c) a first outlet stream to transport the plurality of FCC products to a fractionation zone to separate the plurality of FCC products into one or more of propylene, isobutene, butylenes, gasoline, distillate, diesel fuel, heating oil, slurry oil, or wet gas. The system may include a regenerator connected to and in fluid communication with a second outlet stream of the reactor and having a fourth inlet stream to receive at least oxygen, a fifth inlet stream to receive fluidized plastic, a third outlet stream being connected to and in fluid communication with the third inlet of the riser to supply a regenerated FCC catalyst to the riser, and a fourth outlet stream positioned to discharge a flue gas containing one or more of nitrogen, nitrogen oxides, carbon dioxide, carbon monoxide, or water vapor, the regenerator being operated to oxidize coke on the coked FCC catalyst and the fluidized plastic, thereby to produce the regenerated FCC catalyst and the flue gas.

In embodiments, the system may include a stripping zone connected to and in fluid communication with the second outlet stream and the regenerator, the stripping zone being operated to remove adsorbed and entrained hydrocarbons from the coked FCC catalyst prior to supplying the coked FCC catalyst to the regenerator.

In embodiments, oxidation of the fluidized plastic in the regenerator may increase temperature inside the regenerator by at least about 5° F. (about −15° C.), by at least about 10° F. (about −12° C.), by at least about 20° F. (about −7° C.), or even by at least about 30° F. (about −1° C.), while maintaining a sulfur level in each of the plurality of FCC products, based on one or more specifications of the plurality of FCC products produced by processing the gas oil, below a pre-selected value.

In embodiments, the fluidized plastic is introduced proximate to a bottom portion of the regenerator. The fluidized plastic may be introduced into a bed of the coked FCC catalyst positioned inside the regenerator. The fluidized plastic may be introduced in an amount less than about 2 mass percent of the gas oil introduced into the riser of the FCC unit. The fluidized plastic may be introduced in an amount ranging from about 1 to about 2 mass percent of the gas oil introduced into the riser of the FCC unit.

In embodiments, the system may include a temperature sensor positioned within the regenerator to measure a temperature within the regenerator; and a controller in signal communication with the temperature sensor, the controller configured to, in response to a determination that the temperature within the regenerator is less than a preselected temperature, adjust an amount of the fluidize plastic supplied to the regenerator.

Another embodiment of the disclosure is directed to a system for processing a gas oil in a fluid catalytic cracking (FCC) unit. The system may include a regenerator in fluid communication with a reactor of the FCC unit. The regenerator may include a first inlet to enable introduction of at least oxygen, for example, via air, into the regenerator, a second inlet to enable introduction of plastic into the regenerator, a third inlet configured to receive coked FCC catalyst from the reactor, the regenerator configured to oxidize coke on the coked FCC catalyst and to oxidize the fluidized plastic, thereby to produce the regenerated FCC catalyst, one or more sensors positioned at one more locations of the regenerator and configured to measure one or more characteristics of the regenerator, and a first outlet configured to allow regenerated FCC catalyst to flow to a riser of the reactor. The system may include a controller in signal communication with the one or more sensors and configured to generate a first signal and a second signal based on the one or more characteristics from the one or more sensors. The system may include a first control valve corresponding to the second inlet and configured to, based on the first signal, adjust a flow of fluidized plastic to the regenerator. The system may include a second control valve corresponding to the first outlet and configured to, based on the second signal, to adjust the amount of regenerated FCC catalyst flowing to the riser of the reactor.

In embodiments, the riser may include a fourth inlet to receive the gas oil stream, a fifth inlet to receive steam, and a sixth inlet to receive the FCC catalyst, the riser configured to be operated under cracking reaction pressure and temperature conditions to facilitate mixing and catalytic cracking of the gas oil stream in presence of the steam and the FCC catalyst to form a plurality of FCC products and the coked FCC catalyst. The reactor may include (i) a FCC reaction zone in fluid communication with an upper portion of the riser and configured to continue to crack the gas oil stream in presence of the steam and the FCC catalyst to thereby generate the plurality of FCC products and more of the coked FCC catalyst, (ii) a separation zone to separate the plurality of FCC products from the coked FCC catalyst, and (iii) a second outlet stream to transport the plurality of FCC products to a fractionation zone to separate the plurality of FCC products into one or more of propylene, isobutene, butylenes, gasoline, distillate, diesel fuel, heating oil, slurry oil, or wet gas. The system may further include one or more additional sensors positioned within one or more of the riser or the reactor and configured to measure a temperature within the riser or the reactor. Further, the controller may be in signal communication with the one or more additional sensors and configured to, in response to a determination that the temperature within one or more of the riser or reactor is outside a second threshold range, adjust an amount of the fluidized plastic supplied to the regenerator.

Another embodiment of the disclosure is directed to a controller to control processing a gas oil in a fluid catalytic cracking (FCC) unit. The controller may include a first set of one or more inputs: (a) in signal communication with one or more sensors positioned within one or more of a regenerator, a riser of an FCC unit, or a reactor of the FCC unit, and (b) configured to receive signals from the one or more sensors indicative of a characteristic including one or more of temperature, pressure, and/or flow rate. The controller may include a first set of one or more inputs/outputs in signal communication with one or more flow control devices positioned on one or more inlets associated with one of the regenerator, the riser of the FCC unit, or the reactor of the FCC unit. The controller may be configured to, in response to the characteristic from one of the one or more sensors being less than or greater than a preselected threshold range, adjust, via a signal indicating a new flow rate for a flow control device to adjust to, flow of fluidized plastic into one or more of the regenerator, the riser of the FCC unit, or the reactor of the FCC unit via one or more of the one or more flow control devices.

In embodiments, the controller may include a second input/output in signal communication with a flow control devices positioned on an outlet associated with the regenerator. The controller may be configured to, in response to the characteristic from one of the one or more sensors being less than or greater than a preselected threshold range, adjust, via a signal indicating a new flow rate for the flow control device to adjust to, flow of regenerated catalyst into the riser of the FCC unit via the flow control device. In embodiments, the characteristic may comprise or include one or more of temperature, pressure, composition, or yield percentages.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1A:
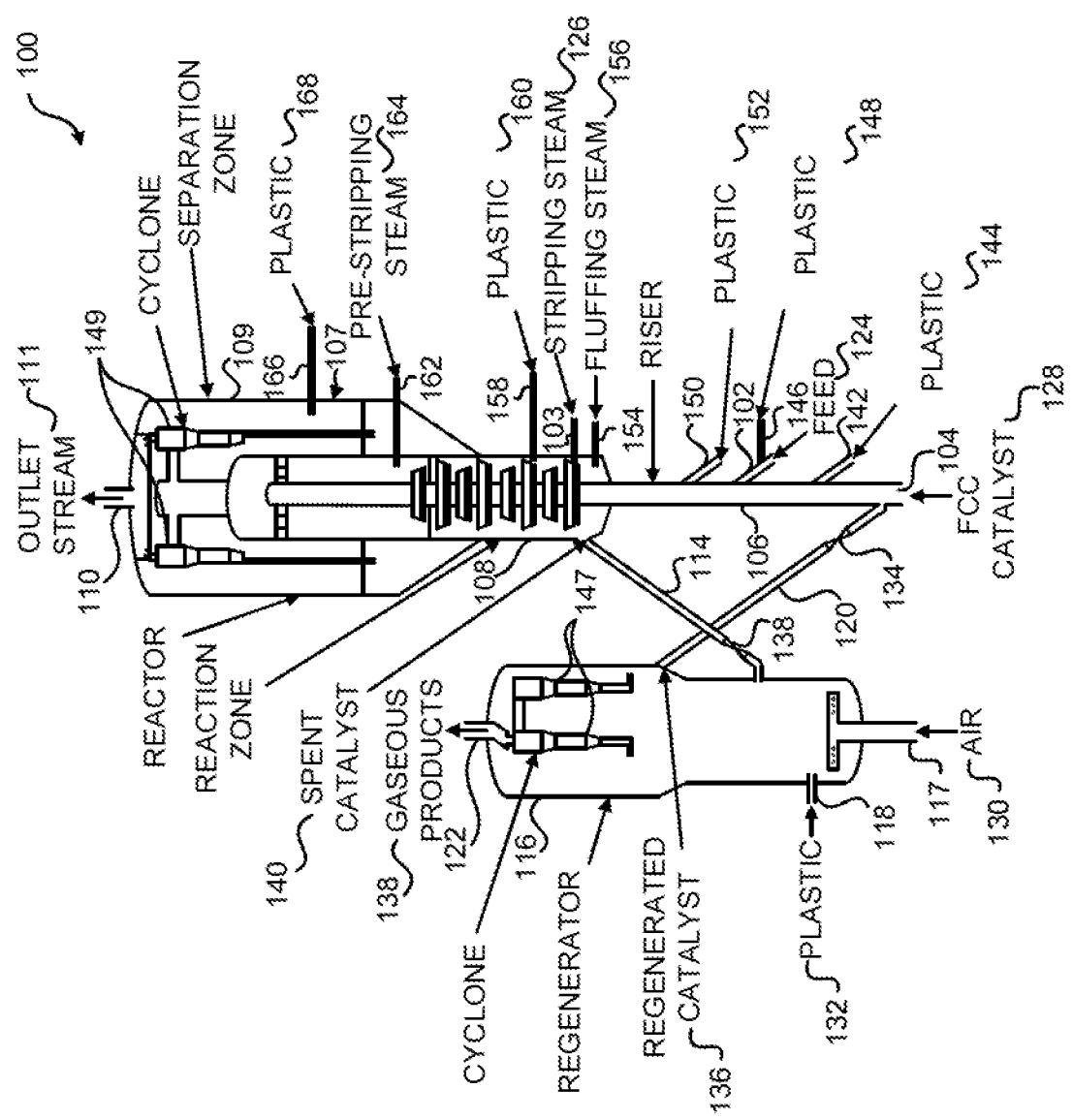
FIG. 1A and FIG. 1B are schematic diagrams of a FCC unit according to an embodiment of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well. As used in the specification, and in the appended claims, the singular forms "a," "an," "the," include plural referents unless the context clearly dictates otherwise.

The FCC unit may include "stacked" and "side-by-side" reactors, as well as other configurations. In a stacked reactor, the FCC reactor and the FCC regenerator may be contained in a single vessel with the FCC reactor above the FCC regenerator. The side-by-side reactor includes a separate FCC reactor and FCC regenerator, in other words, a side-by-side reactor may include two separate vessels, positioned, in embodiments, side by side.

In certain embodiments of the FCC unit, a gas oil stream and steam may be supplied to a riser of a FCC unit. In the riser, the gas oil and steam are brought into contact with the catalyst for catalytic cracking and production of FCC products. The resulting mixture may continue upwardly through an upper portion of the riser. The FCC unit may further include a reactor in communication with the riser for continued generation of FCC products and then separation of the FCC products from the coked FCC catalyst. During catalytic cracking, heavy carbon material, known as coke, may be deposited onto the catalyst. The depositing of coke onto the catalyst may reduce catalytic activity of the catalyst. The catalyst may be regenerated by burning off the coke such that the catalyst may be reused. In certain embodiments, the FCC reactor may be equipped with one or more cyclones. Most, substantially all, or a portion of the coked FCC catalyst may be transported to one or more cyclones in the reactor, where the coked FCC catalyst may be separated from the FCC hydrocarbon products. The FCC products may be transported into a fractionation or distillation zone downstream of the FCC reactor. In certain embodiments, the coked FCC catalyst with the adsorbed or entrained hydrocarbons may be passed or transported through a stripping zone. Stripping gas, such as steam, may enter a lower portion of the stripping zone and may rise counter-current to a downward flow of catalyst through the stripping zone, thereby removing adsorbed and entrained hydrocarbons from the coked FCC catalyst which flow upwardly through and are ultimately recovered with the steam by the one or more cyclones. The FCC unit may further include a regenerator in communication with the FCC reactor, either directly or through the stripping zone, and configured to receive a portion of the coked FCC catalyst. After separation of the FCC products from the coked FCC catalyst, regeneration may be accomplished by burning off the coke from the coked FCC catalyst which restores the catalyst activity of the FCC catalyst. The regenerator may be equipped with inlets to supply oxygen, e.g., via air, and plastic to the coked FCC catalyst. The regenerator may be fed with oxygen and the plastic in any ratio to the coked FCC catalyst by changing the flow rate of each into the regenerator. The plastic and the coke in the coked FCC catalyst are oxidized by oxygen to produce the regenerated catalyst and a flue gas. In an embodiment, the plastic may be injected into the reactor (for example, at one or more locations or alternative locations in the reactor). Further, plastic may be injected into a stand-pipe configured to connect the reactor to the regenerator, into a stripping zone or FCC catalyst stripper of the reactor, the riser, an FCC reactor catalyst bed, at a nozzle located above a gas oil injection point, at a nozzle located below the gas oil injection point, and/or at various other inlets associated with steam and/or other fluids supplied to the reactor and/or regenerator. In another embodiment, the plastic may be introduced into the regenerator and/or reactor at a dense phase of the catalyst, for example, where the catalyst bed includes a density of about 20 lbs/ft$^3$ to about 35 lbs/ft$^3$ or about 30 lbs/ft$^3$. In yet another embodiment, introduction of the plastic may utilize injectors and/or distributors to improve placement of the plastic within the catalyst bed of the regenerator and/or reactor.

In an embodiment, the plastic supplied to the regenerator and/or one or more other locations of the FCC unit may be plastic waste (for example, post-consumer plastic waste and/or industrial plastic, among other types of plastic waste as will be understood by one skilled in the art). The plastic may include or exhibit a low carbon content. Such a characteristic (low carbon content) may be determined based on a Conradson carbon (concarbon) residue test. Such a concarbon test may include measuring carbonaceous residue remaining after burning or pyrolysis. The plastic waste may include one or more different types of plastic, such as, for example, polypropylene, low-density polyethylene, high-density polyethylene, polyethylene terephthalate, polyvinyl chloride, or polystyrene. In some embodiments, a plastic waste may be selected based on potential contaminants contained therein. For example, polypropylene, low-density polyethylene, or high-density polyethylene may be selected due to low amounts, substantially no amounts, or less than typical amounts of contaminants. In other embodiments, a wider variety of plastic waste may be selected (for example, in addition to polypropylene, low-density polyethylene, or high-density polyethylene; terephthalate, polyvinyl chloride, or polystyrene may be selected). Prior to introduction into the FCC unit (such as in the regenerator and/or reactor), the plastic waste may be processed. Such processing may include cleaning and/or milling the plastic. The plastic, in such embodiments, may be milled to granules. The granules may be about the size of the FCC catalyst utilized in the reactor. In an embodiment, the size may be about 1 micrometer to about 350 micrometer, about 80 microns, or about 50 micron to about 100 microns. In an embodiment, the size of the granules may be substantially consistent or substantially the same size, while in another embodiment, the granules may each vary in size. In some embodiments, based on the type or types of plastic waste utilized, the location that the plastic waste is injected into, and/or the type of gas oil injected into the reactor or FCC unit, the plastic waste may be larger than about 350 micrometers. In another embodiment and as noted, the plastic waste may comprise a plastic substantially free from contaminates, such as sulfur, nitrogen, and/or chlorine, among other contaminants that may cause corrosion, fouling, scale, coking, and/or other issues downstream of the FCC unit. The plastic granules, in an embodiment, may be considered or may be fluidized plastic. In other words, as fluid passes through the regenerator and/or reactor, the plastic granules may exhibit fluidic characteristics, similar to the properties of an FCC catalyst as will be understood by one skilled in the art.

In an embodiment, the oxygen may be provided or supplied separate from and/or with ambient and/or atmospheric air. Ambient and/or atmospheric air may include varying amounts of nitrogen, oxygen, and/or other gases (for example, argon, carbon dioxide, water vapor, and/or other small or trace amounts of other gases), as will be understood by one skilled in the art. Further, the ambient and/or atmospheric air may include about 78% nitrogen, about 21% oxygen, and about 1% of other gases (for example, about 0.9% argon, about 0.05% carbon dioxide, and other small or trace amounts of gases including, but not limited to, water vapor, neon, helium, methane, and/or krypton, as will be understood by one skilled in the art). As noted, concentrated oxygen may be supplied to the regenerator (for example, about 100% oxygen). In an embodiment, additional or supplemental concentrated oxygen may be mixed with air (such as, ambient and/or atmospheric air) in varying amounts and supplied to the regenerator, e.g., to increase the ratio of oxygen to nitrogen. For example, the mixture of oxygen and air may include or comprise about 70% nitrogen, about 29% oxygen, and/or other gases; about 60% nitrogen, about 39% oxygen, and/or other gases; about 50% nitrogen, about 49% oxygen, and/or other gases; about 40% nitrogen, about 59% oxygen, and/or other gases; about 30% nitrogen, about 69% oxygen, and/or other gases; 20% nitrogen, about 79%, and/or other gases; about 20% nitrogen, about 79%, and/or other gases; about 10% nitrogen, about 89% oxygen, and/or other gases; about 99% oxygen and/or other gases (such as, a mixture comprised of about 1% total of nitrogen, argon, carbon dioxide, water vapor, and/or other gases, as will be understood by one skilled in the art); and/or other varying percentages of nitrogen, oxygen, and/or other gases. In another embodiment, the additional oxygen may be supplied to the regenerator separate from the air (for example, via another injection point or location). In an embodiment, the amount of air and/or oxygen injected or supplied to the regenerator may be controlled by a controller and/or flow control devices. The amount of air and/or oxygen (in addition to or rather than adjustment of plastic injected into or supplied to the regenerator and/or reactor) may be varied based on the temperature within the regenerator (for example, the temperature which may indicate the amount of coke on the coked catalyst that is combusted).

The regenerator may be operated at temperatures in the range of about 1000° F. (about 538° C.) to 1600° F. (about 871° C.), of about 1000° F. (about 538° C.) to about 1500° F. (about 815° C.), of about 1100° F. (about 593° C.) to about 1450° F. (about 788° C.), at about 1250° F. (about 677° C.) to about 1400° F. (about 760° C.), or about 1300° F. (about 704° C.) to achieve adequate coke combustion while keeping catalyst temperature below those temperatures at which significant catalyst degradation can occur and/or above a temperature such that cracking in the reactor may be efficient (e.g., via adequately regenerated catalyst). In one or more other embodiments, the temperature in the regenerator may not exceed greater than or may be held at about 1450° F. (about 788° C.), about 1400° F. (about 760° C.), about 1350° F. (about 732° C.), about 1300° F. (about 704° C.), about 1250° F. (about 677° C.), about 1200° F. (about 649° C.), about 1150° F. (about 621° C.), about 1100° F. (about 593° C.), about 1050° F. (about 565° C.), and/or about 1000° F. (about 538° C.). The temperature at which significant catalyst degradation occurs may be based on a number of variables, such as the temperature and/or water content within the FCC unit (such characteristics may be monitored via one or more sensors and/or probes), among other factors. This processing of the plastic in the regenerator alleviates FCC processing constraints and optimizes refinery profitability. For example, injecting plastic waste into the regenerator, particularly a clean or substantially contaminate free plastic waste may increase regenerator temperature, alleviating the regenerator temperature constraint or challenge that occurs in typical FCC unit operations. The plastic, when utilized as a FCC feedstock additive, may be injected in low concentrations (for example, about 0 to about 2 mass percent of the gas oil introduced into the riser of the FCC unit) into the regenerator of the FCC unit. In embodiments, the use of plastic as a FCC feedstock additive may result in higher conversions and liquid volume yields with low or ultra-low catalytic coke formation. Utilizing this recycled FCC feedstock additive can sustainably debottleneck FCC operation/constraints and optimize refinery profitability. For example, a FCC unit may be operated continuously at specific temperatures with specific feedstock. Such operations utilize the coke on the coked catalyst to maintain temperature within the reactor. However, utilization of coke is a constraint or bottleneck, particularly for feedstock that does not generate higher levels of coke. Thus, utilizing plastic waste as an energy source will alleviate such a constraint, allowing for continuous operation, use of a product (the plastic waste) that typically is landfilled or sent to a landfill, and produces less coke and higher volumes of products from the FCC unit.

The amount of plastic waste injected into a FCC unit may vary based on a number of factors. For example, the size of the plastic waste granules, the type of gas oil injected into the reactor, a desired yield or product yield, and/or to prevent melting of the plastic within the selected locations of the FCC unit. For example, if large amounts of plastic waste are introduced into the reactor, the plastic may melt and could cause issues, such as inlet or outlet blockages. Thus, the amount (for example, up to about 2 mass percent of the gas oil) and/or size (for example, about 1 micrometer to about 350 micrometer) of the plastic may vary to prevent such issues.

Introduction of the plastic directly into the regenerator of a FCC unit can increase or significantly increase delta coke. In other embodiments, introduction of plastic may not change delta coke (in other words, delta coke may remain the same). Plastic addition or injection into the regenerator increases enthalpy control on reducing catalytic coke yield (coke sources other than catalytic coke yield), regenerator temperature, and/or cat/oil. Further, use of the plastic reduces COx, NOx, and/or SOx emissions. For example, the use of polyethylene generates less, limited, or no sulfur and/or nitrogen, thus reducing the amount of sulfur and/or nitrogen produced and therefore reducing COx, NOx, and/or SOx emissions. Additionally, in another example, the plastic, when injected into the reactor, may reduce or increase delta coke, depending on the injection point of the plastic, among other factors. The plastic may increase residence time and promote higher degrees of cracking the gas oil and the plastic into lighter hydrocarbon products (such as, naphtha or liquefied petroleum gas (LPG)), while reducing or lowering delta coke (when injected into the reactor). In other examples, introduction of plastic into the reactor (for example, the stripper) may not cause a change in delta coke or may even increase delta coke.

FIG. 1A illustrates a schematic diagram of a non-limiting FCC system 100 according to one or more embodiments of the disclosure. A gas oil or feed stream 124 and steam may be supplied to a riser 106 of a FCC system 100 via an inlet, conduit, pipe, or pipeline (for example, conduit 102 and conduit 103, respectively). The feed stream may include gas oil, as noted. In other embodiments, the feed stream may include or may be an amount up to about 1% to about 100% of renewable feedstock, alternative feedstock, and/or plastic (for example, plastic waste, fluidized plastic, and/or plastic granules). Appropriate FCC catalysts 128 may be supplied via a catalyst stream via an inlet, conduit, pipe, or pipeline (for example, inlet 104), as will be understood by one skilled in the art. In the riser 106, the gas oil or feed stream 124 and steam may be brought into contact with the FCC catalyst 128 or catalyst stream for catalytic cracking and production of FCC products.

In certain embodiments, the gas oil or feed stream 124 can contain one or more of other feeds, such as biomass, pyrolysis oil, renewable feedstock, conventional FCC feed streams, and/or decant oil, in addition to added plastic. The riser 106 may be operated under cracking reaction pressure and temperature conditions to facilitate mixing and catalytic cracking of the gas oil stream in the presence of the steam and the FCC catalyst (and/or, in some embodiments, plastic) to generate, produce, or yield a plurality of FCC products and coked FCC catalyst. The reaction temperature, feed stream rates, feed residence time, gas oil/steam FCC feed concentrations, and FCC catalyst loadings may be modified to obtain maximum fuel range products. The resulting mixture continues upwardly to the FCC reactor 107 through an upper portion of the riser 106. The FCC reactor 107 may contain or include a FCC reaction zone 108 connected to and in fluid communication with the upper portion of the riser 106 and operated to continue the cracking of the gas oil stream in presence of the steam and the FCC catalyst to generate, produce, or yield more of the plurality of FCC products and more of the coked FCC catalyst. The FCC reactor 107 may contain a separation zone 109 to separate the plurality of FCC products from the coked FCC catalyst. In certain embodiments, the separation zone 109 may contain one or more cyclones 149 to separate the coked FCC catalyst from the plurality of FCC products, as will be understood by one skilled in the art. The FCC reactor 107 may also contain an outlet 110 to transport the plurality of FCC products from the separation zone 109 to a fractionation zone to separate the plurality of FCC products into one or more of propylene, isobutene, butylenes, gasoline, distillate, diesel fuel or heating oil, slurry oil, and wet gas.

The FCC reactor 107 and/or the riser 106 may include a number of different inlets. For example, the riser 106 may include an inlet 142 and an inlet 150. Inlet 142 and an inlet 150 may be dedicated inlets to enable injection of an amount of plastic (for example, plastic waste, fluidized plastic, and/or plastic granules) into the riser 106. Inlet 142 may be positioned upstream of the conduit 102. Inlet 150 may be positioned downstream of the conduit 102. In an embodiment, the riser may include one or more of inlet 142 or an inlet 150. Further, plastic (and/or, in some embodiments, another additive) may be injected with the FCC catalyst 128, with the gas oil or feed stream 124 (for example, via the conduit 102), with the stripping steam 126 (for example, via conduit 103), and/or with a fluffing steam 156 (for example, via conduit 154). Further, the plastic may be injected into the other zones of the FCC reactor 107, such as with a pre-stripping steam 164 (for example, via conduit 162) and/or via another dedicated inlet 166 (for example, plastic 168). As noted, one or all of these inlets or conduits may be utilized to inject an amount or portion of plastic (and/or, in some embodiments, other feedstock and/or additives). The plastic may be cracked or a portion of the plastic may be cracked along with the gas oil. Any remaining plastic may be transported, along with spent catalyst 140 to the regenerator 116. In such embodiments, the remaining plastic may be deposited onto the spent catalyst, along with coke, for example, when the renewable feedstock polymerizes about, hardens onto, or otherwise becomes attached to the spent catalyst 140. Flow control devices (for example, valves, pumps, and/or other devices configured to control flow) may be positioned along or on each of the conduits or inlets to control an amount of plastic injected into the FCC reactor 107. Further, the same or different types of plastic may be injected or supplied at each of a plurality of the conduits or inlets. The conduits or inlets, as noted, may be dedicated inlets for plastic. The dedicated inlets may be retro-fitted, added to, and/or installed on the FCC reactor 107 or FCC unit.

In certain embodiments, the coked FCC catalyst 128 with the adsorbed or entrained hydrocarbons may be passed into a stripping zone. Stripping gas, such as steam, may enter or may be injected into a lower portion of the stripping zone. The stripping gas may rise counter-current to a downward flow of catalyst through the stripping zone, thereby removing adsorbed and entrained hydrocarbons from the coked FCC catalyst which flow upwardly through and are ultimately recovered with the steam by the one or more cyclones 149, as will be understood by one skilled in the art. The FCC system 100 may further include a regenerator 116 in fluid communication with the FCC reactor 107 (for example, via a conduit, pipe, inlet/outlet, or pipeline), either directly or through the stripping zone, and configured to receive a portion of the coked FCC catalyst via a spent catalyst stream (for example, via conduit 114). A valve 138 may be positioned on the conduit 114 to control the amount of the coked FCC catalyst flowing to the regenerator 116. After separation of the FCC products from the coked FCC catalyst, regeneration may be accomplished by burning off the coke from the coked FCC catalyst, which restores the catalytic activity of the FCC catalyst. The regenerator 116 may be equipped with an air inlet 117 to supply air 130 and a plastic inlet 118 to supply plastic (for example, plastic waste, milled plastic, plastic granules, and/or fluidized plastic, among other types of plastic) to the coked FCC catalyst. The regenerator 116 may be fed with air 130 and/or oxygen and the plastic in any ratio to the coked FCC catalyst by changing the flow rate of air supplied via the air inlet 117 and the plastic 132 supplied via the plastic inlet 118 into the regenerator 116. The plastic 132 and the coke in the coked FCC catalyst may be oxidized by oxygen in the air to produce the regenerated catalyst. Such a reaction may be exothermic as a large amount of heat is released from the oxidation. The gaseous products of coke oxidation, which may be referred to as flue gas, may be collected, such as via one or more cyclones 147, and exit the regenerator 116 via the exit stream 122 (for example, for further use or for cleaning, filtering, sequestration, and/or other uses). The balance of the heat may cause the regenerator to produce the regenerated catalyst. The regenerated catalyst, in addition to providing a catalytic function, may act as a vehicle for the transfer of heat from the regenerator 116 to the riser 106. The regenerated catalyst may be transported from the regenerator 116 via a catalyst outlet stream to the riser 106 (for example, via a conduit 120). A valve 134 may be positioned on the conduit 120 to control the amount of the regenerated catalyst flowing to the riser 106. In an embodiment, the regenerated catalyst from the catalyst outlet stream, via conduit 120, may be mixed with a small amount of fresh catalyst (such as, in relation to the amount of regenerated catalyst) and supplied to the riser 106 of a FCC system 100 via the catalyst stream at inlet 104. Such a process may be considered a continuous process. In embodiments, the fresh catalyst may be supplied periodically.

Figure 1B:
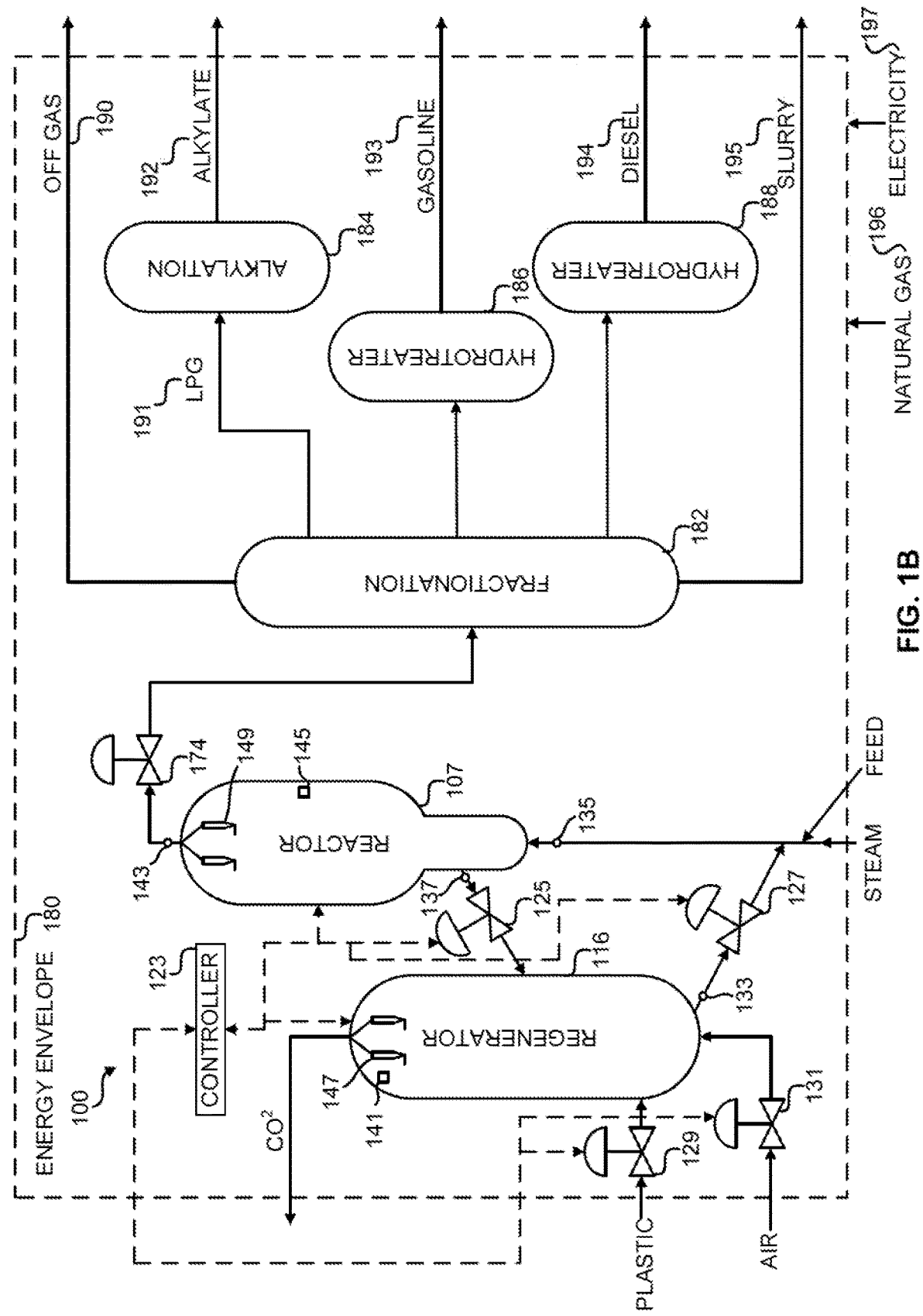

In certain embodiments, the regenerator 116 of an existing FCC unit may be adapted or retro-fitted to add an element to allow for the introduction of the plastic to the regenerator. For example, such an element can be an installed independent conduit, pipe, or pipeline for introducing the plastic (for example, plastic inlet 118). The flow through this element can be initiated, modified, or stopped by an independent control system or by a control system (such as a controller, as illustrated in FIG. 1B and/or FIG. 5) for the regenerator or the FCC unit. Various control designs and/or schemes may also be suitable for use in introduction of the plastic to the regenerator of an existing FCC unit. Various configurations and arrangements of the FCC reactor and the regenerator, including the positioning of various sections and/or components therein, may vary as will be understood by a person skilled in the art. Further, other additives and/or feedstock may be introduced into the regenerator 116 and/or FCC reactor 107.

In another embodiment, the FCC system 100 may include a controller or control system (for example, controller 123 in FIG. 1B and controller 502 in FIG. 5) and various sensors, probes, analyzers, and/or control valves (for example, valve 134 and/or valve 138) positioned throughout the FCC system 100 and in signal communication with the controller or control system. The controller or control system may receive and send information, data, and/or instructions to and from, respectively, the various sensors, probes, analyzers, and/or control valves. In such examples, the controller or control system may receive some characteristic regarding one or more different parts or products of the FCC system 100 from the sensors, analyzers, and/or probes (such as, temperature within the regenerator 116, riser 106, FCC reactor 107, and/or composition and/or yield of FCC hydrocarbon products) and, based on those characteristics and one or more preselected thresholds (for example, a preselected temperature range within the regenerator 116, riser 106, and/or FCC reactor 107), adjust flow and/or amount of one or more materials or fluids flowing into or supplied to the regenerator 116, riser 106, and/or FCC reactor 107 (for example, gas oil, plastic, pyoil, renewable feedstock, fresh catalyst, regenerated catalyst, air, and/or steam).

FIG. 1B is a schematic diagram of a non-limiting, FCC system 100 according to one or more embodiments of the disclosure. The FCC system 100, as described in FIG. 1A, may include a FCC reactor 107 and regenerator 116. Those components (and in another embodiment, other components) may be a part of an energy envelope 180 (for example, the components may utilize heat from one another to ensure thermally stable processes with minimal external heating, such as from natural gas 196 and/or electricity 197). The FCC system 100 may include a control valve 174 to control the amount or flow of FCC hydrocarbon products flowing to a fractionation or distillation tower 182. The fractionation or distillation tower 182 may produce an off gas 190, an LPG 191 (which may be processed further via an alkylation unit 184 to produce an alkylate 192), a gasoline 193 (after passing a product through a hydrotreater 186), a diesel 194 (after passing a product through a hydrotreater 188), and/or a slurry 195.

Further, the FCC system 100, as noted, may include a controller 123 and one or more sensors, analyzers, and/or control valves positioned throughout. For example, the FCC system 100 may include a sensor 135 positioned along the riser. The sensor 135 may measure one or more of the pressure, temperature, and/or other characteristics of the materials flowing into the riser (such as, regenerated catalyst, plastic, gas oil, and/or other additives or feedstock) and provide the measurement, periodically or continuously, to the controller 123. The FCC system 100 may include a sensor 137 to measure one or more of the pressure, temperature, and/or other characteristics of the coked catalyst flowing from the FCC reactor 107 to the regenerator 116 and provide the measurement, periodically or continuously, to the controller 123. The FCC system 100 may include a sensor 145 and/or analyzer to measure one or more of the pressure, temperature, and/or other characteristics of the materials within one or more different locations of the FCC reactor 107, as well as provide the measurement, periodically or continuously, to the controller 123. The FCC system 100 may include a sensor 143 to measure one or more of the pressure, temperature, and/or other characteristics of the products produced in the FCC reactor 107 and provide the measurement, periodically or continuously, to the controller 123. The FCC system 100 may include a sensor 133 to measure one or more of the pressure, temperature, and/or other characteristics of the regenerated catalyst flowing from the regenerator 116 to the riser and/or FCC reactor 107 and provide the measurement, periodically or continuously, to the controller 123. Finally, the FCC system 100 may include a sensor 141 and/or analyzer to measure one or more of the pressure, temperature, and/or other characteristics of the materials within one or more different locations of the FCC reactor 107, as well as provide the measurement, periodically or continuously, to the controller 123.

The FCC system 100 may include one or more control valves (for example, control valve 127, control valve 129, and control valve 131) and/or, in other embodiments, other flow control devices (for example, a pump). Each control valve (and/or other flow control devices) may adjust the flow of a fluid or material based on a preselected threshold and a signal received from the controller 123. For example, control valve 129 and control valve 131 may adjust the amount of plastic and air, respectively, introduced into (in other words, the flow rate of the plastic and air, respectively) the regenerator 116. The controller 123 may determine the flow rate based on the temperature within regenerator 116, the temperature of regenerated catalyst flowing from the regenerator 116, the temperature within the FCC reactor 107, the temperature of coked catalyst flowing from the FCC reactor 107, the yield and/or amount of products produced, the pressure within the regenerator 116, and/or the temperature within the riser, among other factors. For example, if the temperature within the FCC reactor 107 is below a specified threshold and/or if the yield and/or amount of products produced or flowing from the FCC reactor 107 is below another specified threshold, then the controller 123 may increase the amount of plastic flowing into the regenerator 116 (or into other locations). The controller 123 may transmit a signal indicative of the flow rate to the corresponding control valve, causing the corresponding control valve to adjust such that the indicated flow rate is reached. Further, based on such factors, the amount of regenerated catalyst flowing to the regenerator 116 from the FCC reactor 107 may be adjusted via control valve 125. Finally, the control valve 127 may control the amount of regenerate catalyst flowing from the regenerator 116 to FCC reactor 107 based on the temperature within regenerator 116, the temperature of regenerated catalyst flowing from the regenerator 116, the temperature within the FCC reactor 107, the temperature of coked catalyst flowing from the FCC reactor 107, the pressure within the regenerator 116 and/or FCC reactor 107, the yield and/or amount of products produced, and/or the temperature within the riser, among other factors. Other factors may be utilized to determine the flow rates described herein, such as pressure within other components and/or current flow rates, as well as analysis of the materials described herein (such as products and/or byproducts of the reactor and/or regenerator).

Figure 2:
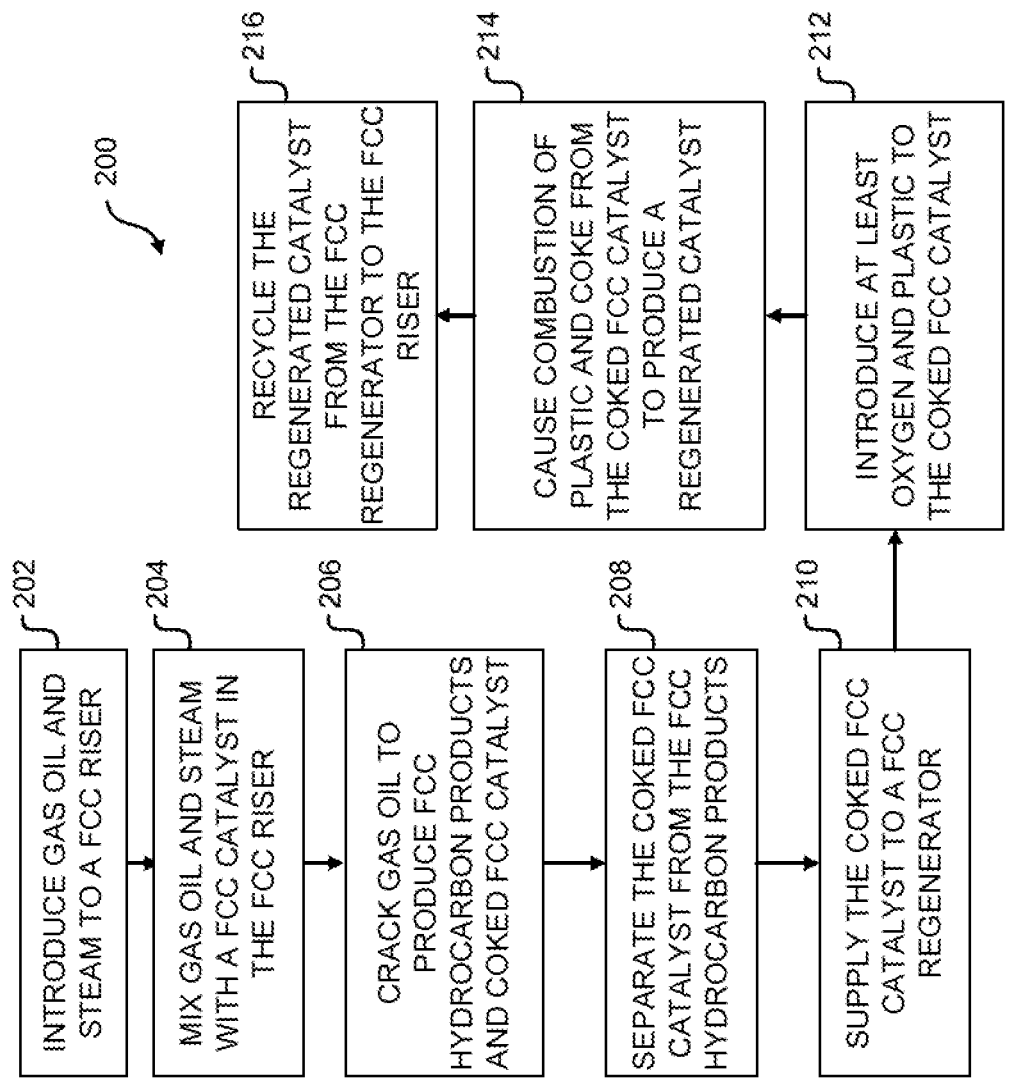
FIG. 2 is a block diagram of a method for processing of hydrocarbons in a FCC unit by introduction of a plastic into the regenerator of the FCC unit, according to an embodiment of the disclosure.

FIG. 2 is a block diagram of a method 200 for enhancing the processing of hydrocarbons in a FCC unit by introduction of a plastic into the regenerator of the FCC unit. In an embodiment, the actions of method 200 may be completed within a control system (such as controller 123 or controller 502). Specifically, method 200 may be included in one or more programs, protocols, or instructions loaded into a memory of the control system and executed on a processor or one or more processors of the control system. The order in which the operations are described is not intended to be construed as a limitation, and any number of the described blocks may be combined in any order and/or in parallel to implement the methods.

At block 202, an amount of gas oil and steam may be introduced to into a riser of a FCC unit. The gas oil can be one or more of the following feeds: atmospheric and vacuum gas oil, light and heavy coker gas oil, hydrocracked residue, atmospheric residue, or deasphalted oil. The hydrocarbons in the gas oil feed may include paraffins and/or cycloparaffins, aromatic hydrocarbons with a different number of aromatic rings, and resins and/or asphaltenes. At block 204, the gas oil and the steam are mixed with a FCC catalyst that is fluidized in the riser, and at block 206, the gas oil is subject to catalytic cracking of the higher molecular weight hydrocarbons into one or more FCC products. The cracking of the gas oil causes one or more surfaces of the catalyst to be at least partially covered by coke, thus producing a coked FCC catalyst. At block 208, the coked FCC catalyst is separated from the one or more FCC products in one or more cyclones of the FCC unit and at block 210 of passing the coked FCC catalyst to a regenerator (for example, from the one or more cyclones of the FCC unit). Further, at block 212, oxygen (and/or, in some embodiments, air) and plastic (such as, granular plastic, milled plastic, recycled plastic, and/or fluidized plastic, among, in other embodiments, other type of additives and/or feedstock) are introduced into the regenerator and mixed with the coked FCC catalyst, and at block

214, the plastic and coke from the coked FCC catalyst undergo combustion in the regenerator. The plastic and coke are oxidized by the oxygen (and/or, in some embodiments, the oxygen in the air) to provide a regenerated catalyst, which is then returned at block 216 from the regenerator to the riser of the FCC unit. In certain embodiments, the plastic has an effective hydrogen index of higher than about 1.5, and, in another embodiment, a hydrogen index of 2 or even greater. The hydrogen index of the plastic granules may be determined via the following equation:

$$\frac{H - 2O - 3N - 2S}{C}$$

where H is hydrogen atoms, C is carbon atoms, O is oxygen atoms, N is nitrogen atoms, and S is sulfur atoms. In such examples, oxygenates having a hydrogen index of less than 1 cause excessive amounts of coke to be produced. Thus, introducing the plastic into the regenerator can allow the temperature inside the regenerator to be increased without adversely affecting one or more properties of the one or more FCC products. This temperature increase can range from at least about 5° F. (about −15° C.) to about 100° F. (about 38° C.). In other words, by utilizing varying amounts of plastic, the temperature within the regenerator, and, thus, the temperature within the reactor, may be controlled and/or adjusted. In certain embodiments, introducing the plastic increases the temperature inside the regenerator while maintaining sulfur specifications of the one or more FCC products. For example, the sulfur level in a specification of gasoline, a FCC product, is maintained below a pre-selected value. More than 90% of the sulfur content, but generally less than 50% of the total gasoline supply, is contributed by heavier feeds, which are cracked in the FCC. Current maximum gasoline sulfur limits vary widely from 10 ppm to 2,500 ppm depending on the jurisdiction. The sulfur content of the various FCC products can vary from about 0.01 or even lower (based on the type and/or amount of plastic used) weight percent to about 4.5 weight percent. Certain products, such as ultra-low sulfur diesel, low sulfur vacuum gas oil, and low sulfur heavy fuel oils, have a sulfur content less than about 0.5 weight percent. Certain products, such as GVL slurry and heavy sulfur vacuum gas oil, have a sulfur content from about 1 weight percent to about 2 weight percent. Certain products, such as heavy sulfur heavy fuel oil and asphalt, have a sulfur content from about 3 weight percent to about 4.5 weight percent. In another embodiment, the plastic can be introduced proximate to a bottom portion of the regenerator or the plastic can be introduced into a bed of coked FCC catalyst positioned inside the regenerator (or in other locations of the regenerator). In another embodiment, the plastic may be introduced into the reactor at one or more alternative locations. The alternative locations may include or comprise one or more of injection points separate from the gas oil injection point, at a FCC reactor catalyst bed, at an FCC catalyst stripper, at a nozzle located above or downstream of a gas oil injection point, at a nozzle below or upstream of the gas oil injection point, and/or at various points where steam is introduced into the FCC unit (for example, the plastic may be injected along with stripping steam, pre-stripping steam, or fluffing steam).

In certain embodiments, the quantity of plastic that is introduced in the FCC regenerator is less than about 2 mass percent of the gas oil introduced into the riser of the FCC unit. In certain embodiments, the quantity of plastic that is introduced in the FCC regenerator ranges from about 1 to 2 mass percent of the gas oil, and in some embodiment even greater, introduced into the riser of the FCC unit.

Figure 3:
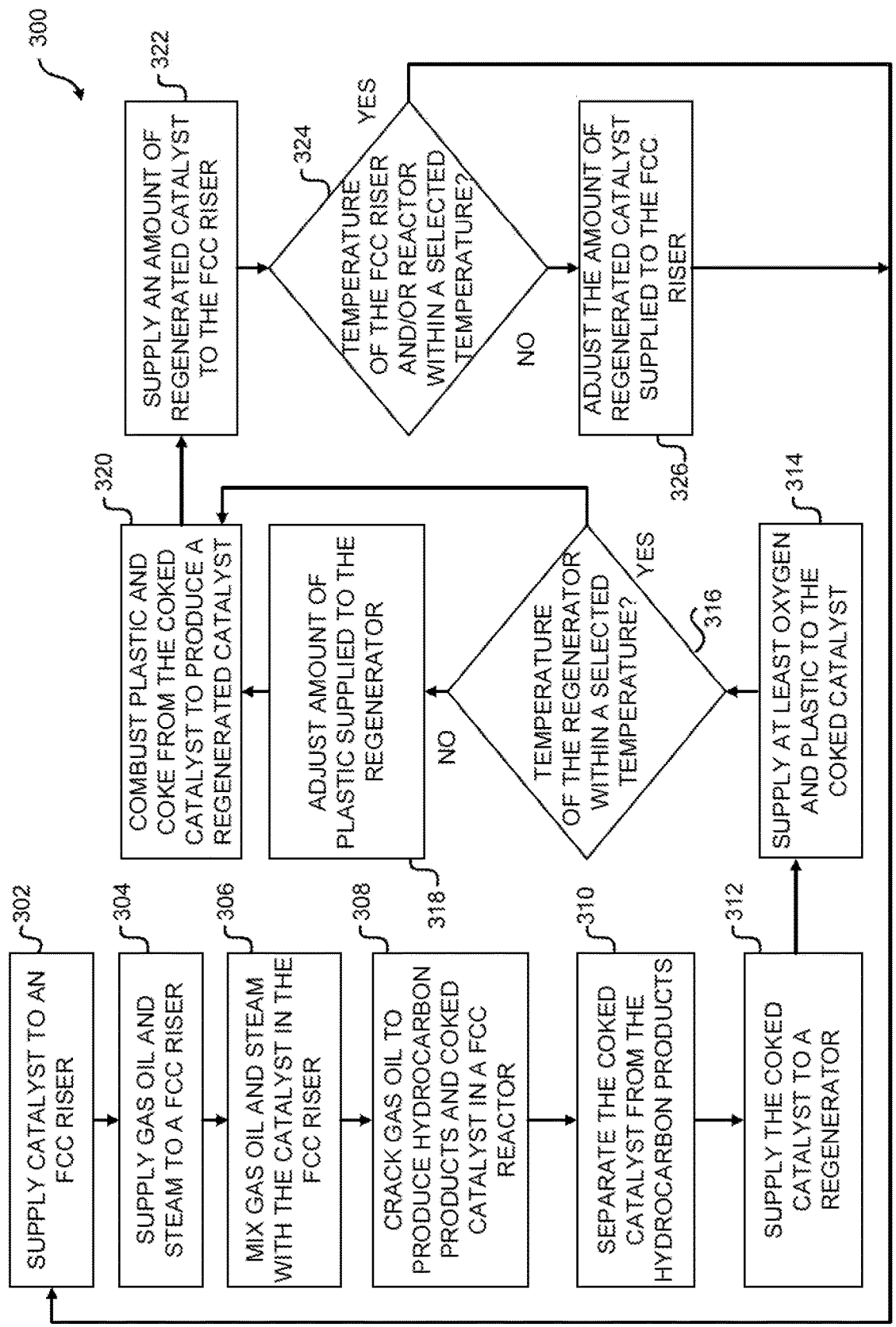
FIG. 3 is another block diagram of a method for processing of hydrocarbons in a FCC unit by introduction of a plastic into the regenerator of the FCC unit, according to an embodiment of the disclosure.

FIG. 3 is a block diagram of a method 300 for enhancing the processing of hydrocarbons in a FCC unit by introduction of a plastic into the regenerator of the FCC unit. In an embodiment, the actions of method 300 may be completed within a control system (such as controller 502). Specifically, method 300 may be included in one or more programs, protocols, or instructions loaded into a memory of the control system and executed on a processor or one or more processors of the control system. The order in which the operations are described is not intended to be construed as a limitation, and any number of the described blocks may be combined in any order and/or in parallel to implement the methods.

At block 302, during a cracking operation or upon an initiation of a cracking operation, an amount of catalyst may be supplied to a riser or FCC riser of a FCC unit. The catalyst (also referred to as a FCC catalyst) may be comprised of a zeolite and/or other components (for example, a matrix, binder, or filler, as will be understood by one skilled in the art), as will be understood by one skilled in the art. As catalyst within the FCC unit is utilized in a cracking operation, the catalyst may attract coke or become coked (for example, coke accumulates on the catalyst). The coked or spent catalyst may be transferred from the FCC unit and regenerated catalyst may be supplied the riser of the FCC unit. In an embodiment, the amount of regenerated catalyst supplied to the FCC unit may be adjusted based on the current amount of catalyst within the FCC unit. In such examples, a control system (such as, controller 123 or controller 502) may determine the current amount of catalyst in the FCC unit based on the amount of coked catalyst transferred to a regenerator, the amount of fresh catalyst supplied to the FCC unit (which may be a small amount or a small amount in relation to the regenerated catalyst), the amount of regenerated catalyst supplied to the FCC unit, the composition of hydrocarbon products produced by the FCC unit, and/or one or more selected product yields from the FCC unit. In another example, the control system (such as, controller 502) may determine the current amount of catalyst in the FCC unit based on a signal indicating such an amount from a sensor.

At block 304, a gas oil and steam may be supplied to the riser of the FCC unit. In an embodiment, the gas oil may be preheated prior to introduction or being supplied to the riser of the FCC unit. The temperature within the FCC unit (for example, based on the temperature of the steam, gas oil, and/or catalyst), or the riser and/or reactor of the FCC unit, may be within the range of about 650° F. (about 343° C.) to about 1050° F. (about 566° C.), or even higher, to perform a cracking operation based on the type of gas oil supplied to the FCC unit as will be understood by one skilled in the art. Further, heat from regenerated catalyst may be utilized to increase temperature, as described herein and with further detail below, such as the temperature of the riser, reactor, and/or regenerator.

At block 306, the gas oil and steam may mix with the catalyst in the riser of the FCC unit. At block 308, the gas oil may be cracked (for example, higher molecular weight hydrocarbons are converted or cracked to smaller vaporous molecule). Such a cracking operation may cause coke or carbonaceous material to form on the surface of the catalyst thereby forming a coked catalyst. Forming of the coke on the catalyst may reduce the catalytic capability of the catalyst, thus, to utilize the catalyst in further operations or again, the coked catalyst may be passed through a regenerator.

At block 310, the coked catalyst may be separated from the hydrocarbon or gas products formed via the cracking operation. Such separation may occur via one or more cyclones included in the reactor of the FCC unit, as will be understood by one skilled in the art. At block 312, the coked catalyst may flow to or be supplied or pumped to the regenerator via a pipe, pipeline, or conduit. The amount and/or rate of coked catalyst flowing to the regenerator may be controlled via a flow control device positioned on the pipe, pipeline, or conduit. At block 314 oxygen (such as, oxygen and/or ambient and/or atmospheric air) and plastic (such as, granular plastic, milled plastic, recycled plastic, and/or fluidized plastic, among, in other embodiments, other type of additives and/or feedstock) may be supplied to the regenerator (for example, mixed with the coked catalyst). The oxygen (for example, oxygen and/or ambient and/or atmospheric air) may be utilized to aid in combustion of the coke deposited on the coked catalyst. Further, if the oxygen is supplied as air, additional oxygen may be supplied with the air. As the operation of regeneration is an exothermic reaction, the temperature within the reactor may increase (for example, during combustion). Such an operation (for example, regeneration and cracking) may be a continuous or substantially continuous process. As such, at block 316, the temperature of the regenerator may be determined. In such examples, a temperature sensor may be disposed within the regenerator and utilized to provide an indication of the temperature within the regenerator. The temperature within the regenerator may vary based on the heat from the coked catalyst and the amount of plastic injected into the regenerator, among other factors. Further, combustion of the plastic and coke deposited on the coked catalyst may generate flue gas. The flue gas may comprise one or more of nitrogen, nitrogen oxides, carbon dioxide, carbon monoxide, or water vapor. The flue gas may be discharged from the regenerator at an outlet positioned proximate a top or upper portion of the regenerator.

If the temperature within the regenerator is not within a selected temperature, then, at block 318, the amount of plastic injected into or supplied to the regenerator may be adjusted. For example, if the regenerator is below a selected temperature, then the amount of plastic injected into the regenerator may be increased, while if the temperature is above the selected temperature, then the amount of plastic injected into the regenerator may be decreased. After adjustment of the amount of plastic or if the temperature is within the selected temperature, then, at block 320, the plastic and coke may be combusted to form a regenerated catalyst. In another embodiment, and as noted, combustion may be continuous. Thus, in such an embodiment, the adjustment of the amount of plastic injected into the regenerator and combustion of the plastic and coke may occur in parallel or substantially simultaneously. The amount of plastic injected into the regenerator may be controlled via a flow control device positioned along an inlet of the regenerator, the inlet configured to allow plastic to enter the regenerator.

At block 322, an amount of regenerated catalyst may be supplied to the riser of the FCC unit. In an embodiment, the regenerated catalyst may be stored or supplied to a well or stand-pipe, prior to transfer or reintroduction to the riser of the FCC unit. The regenerate catalyst, at this point may be at high temperature that is lower than a temperature at which the catalyst may degrade. The temperature of the regenerated catalyst may be about range of about 1000° F. (about 538° C.) to 1600° F. (about 871° C.), of about 1000° F. (about 538° C.) to about 1500° F. (about 815° C.), of about 1100° F. (about 593° C.) to about 1450° F. (about 788° C.), at about 1250° F. (about 677° C.) to about 1400° F. (about 760° C.), or about 1300° F. (about 704° C.). In one or more other embodiments, the temperature of the catalyst may not exceed greater than about 1450° F. (about 788° C.), about 1400° F. (about 760° C.), about 1350° F. (about 732° C.), about 1300° F. (about 704° C.), about 1250° F. (about 677° C.), about 1200° F. (about 649° C.), about 1150° F. (about 621° C.), about 1100° F. (about 593° C.), about 1050° F. (about 565° C.), and/or about 1000° F. (about 538° C.). The regenerated catalyst may maintain such a temperature within the well or stand-pipe for a period of time prior to reintroduction or transfer to the riser of the FCC unit. The supplied amount of regenerated catalyst may mix or be mixed with one or more of fresh catalyst, additional or new gas oil, and/or steam. In such embodiments, the cracking operation may continue with the supplied regenerated catalyst. Further, the cracking operation may be a continuous or substantially continuous operation, with such adjustments described herein occurring as the cracking operation is executed.

At block 324, the temperature of or within the riser of the FCC unit and/or of or within the reactor of the FCC unit may be determined (such as, via a temperature sensor or probe). If the temperatures of the riser and/or reactor are not within a selected temperature, then, at block 326, the amount of regenerated catalyst supplied to the riser and/or the amount of plastic supplied to the regenerator may be adjusted. In another embodiment, the temperature of or within other portions or locations of the FCC unit may be determined and adjustment of the amount of regenerated catalyst supplied to the riser and/or the amount of plastic supplied to the regenerator may be performed based on that temperature.

In an embodiment, an amount of fresh catalyst may be supplied (or such a supply may be adjusted) to the riser. The amount of fresh catalyst supplied to the riser may be a small amount in relation to the amount of regenerated catalyst supplied to the riser. In other words, small amounts of fresh catalyst may be supplied to the riser from time to time.

For example, if the FCC unit is operating at slightly below optimal conditions (for example, the temperature is too cool within the riser and/or reactor), then, rather than or in addition to increasing preheating of the gas oil or increasing the temperature of the steam (or, in other embodiments, being heated via another external heat source), an additional amount of regenerated catalyst, at a higher temperature, may be mixed with the gas oil. Further, the amount of plastic used in the regenerator may be increased to thereby increase the temperature of the regenerated catalyst. Thus, the overall temperature within the riser and/or reactor may be increased using a plastic, such as a recycled amount of plastic, and the overall efficiency of the FCC unit may be increased (for example, operating at a higher temperature without increasing heating from any other source).

In another embodiment, rather than or in addition to, injection of the plastic into the regenerator, the plastic may be included in or injected into a stripping zone of the reactor and/or via a stand-pipe connecting the reactor to the regenerator (for example, at about 1% to about 2% wt % of plastic, or in some embodiments greater amounts, in relation to the gas oil). In such embodiments, the amount of plastic may be varied based on the same factors described above (such as, temperature within the regenerator, temperature within riser and/or reactor, and/or temperature of the regenerated catalyst), among other factors. The plastic may increase the temperature within the reactor and increase overall yield of the FCC unit. Further, the plastic may include low or substantially none of sulfur, thus adding the plastic, for example, into a stripping zone of the reactor and/or via a stand-pipe connecting the reactor to the regenerator may not impact hydrocarbon or gas product specifications, particularly specifications with low sulfur. Further, the plastic may be low in hydrogen, thereby preventing or inhibiting production of saturated products and favoring production of olefinic material.

In another embodiment, the method 300 may include determining, based on a signal received by a controller from a temperature sensor positioned within the regenerator, a temperature within the regenerator. Further, the temperature within the FCC unit may be determined, based on a signal received by a controller from a temperature sensor positioned within the FCC unit, a temperature within the FCC unit. Further still, in response to one or more determinations that the temperature within the regenerator is less than a first preselected temperature or that the temperature within the FCC unit is less than a second preselected temperature, a flow control device associated with the plastic in signal communication with the controller may be adjusted, via the controller, such that an amount of the plastic introduced into the riser may be adjusted based on (1) the temperature within the regenerator and/or (2) the temperature within the FCC unit to thereby adjust the temperature within the regenerator and riser.

Figure 4:
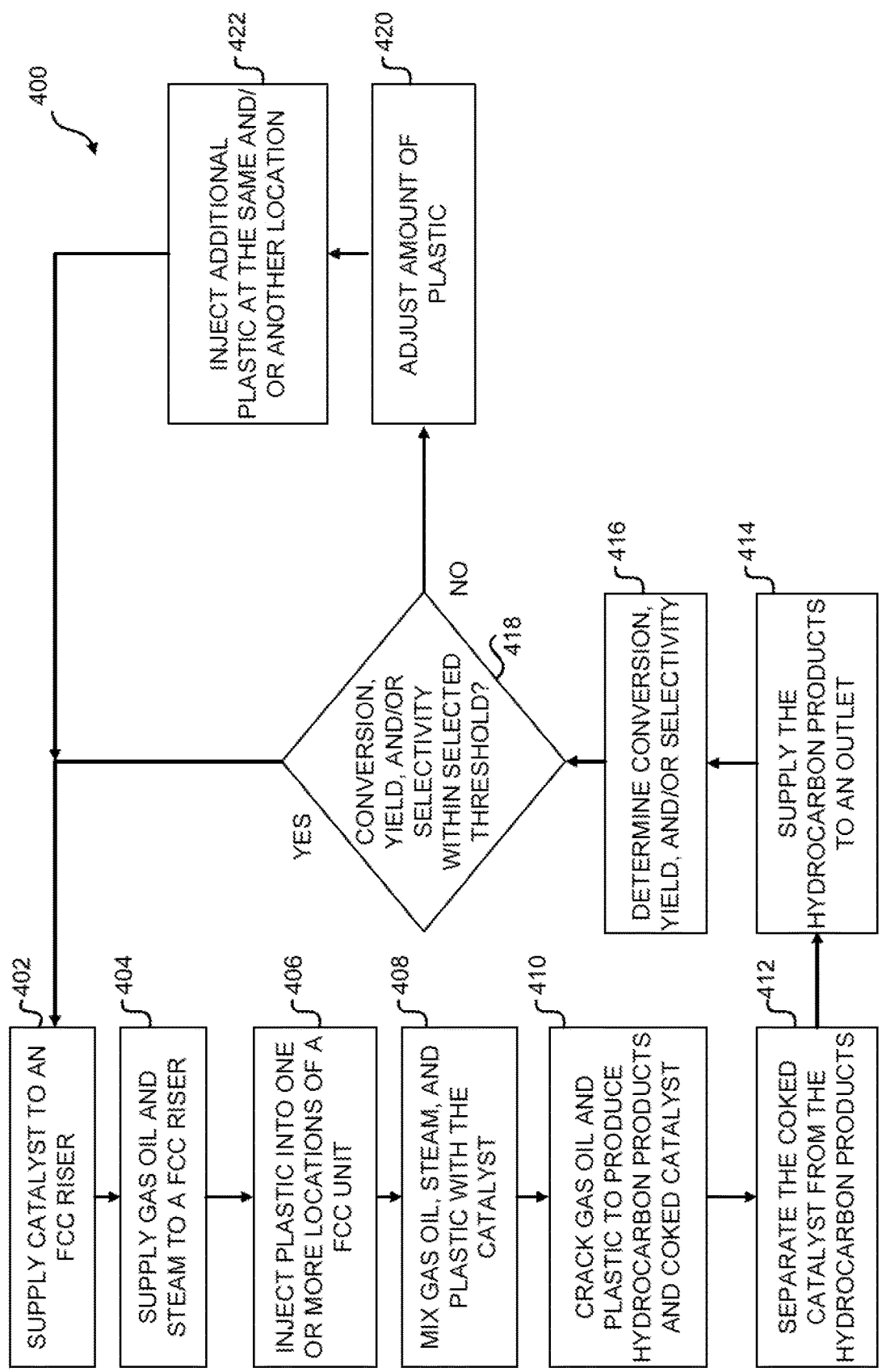
FIG. 4 is another block diagram of a method for processing of hydrocarbons in a FCC unit by introduction of a plastic into one or more locations of the FCC unit, according to an embodiment of the disclosure.

FIG. 4 is a block diagram of a method 400 for enhancing the processing of hydrocarbons in a FCC unit by introduction of plastic into the FCC unit. In an embodiment, the actions of method 400 may be completed within a control system (such as, such as controller 123 or controller 502). Specifically, method 400 may be included in one or more programs, protocols, or instructions loaded into a memory of the control system and executed on a processor or one or more processors of the control system. The order in which the operations are described is not intended to be construed as a limitation, and any number of the described blocks may be combined in any order and/or in parallel to implement the methods.

At block 402, during a cracking operation or upon an initiation of a cracking operation, an amount of catalyst may be supplied to a riser or FCC riser of a FCC unit. The catalyst (also referred to as a FCC catalyst) may be comprised of a zeolite and/or other components (for example, a matrix, binder, and/or filler), as will be understood by one skilled in the art. The amount of catalyst supplied to the riser of the FCC unit may vary over time. For example, as catalyst within the FCC unit is utilized in a cracking operation, the catalyst may attract or become coked (for example, coke accumulates on the catalyst). The coked or spent catalyst may be transferred from the FCC unit and new or fresh and/or regenerated catalyst may be supplied the riser of the FCC unit. The amount of catalyst supplied to the FCC unit may be adjusted based on the current amount of catalyst within the FCC unit. In such examples, a control system (such as, such as controller 123 or controller 502) may determine the current amount of catalyst in the FCC unit based on the amount of catalyst transferred to a regenerator, the amount of catalyst supplied to the FCC unit, the composition of hydrocarbon products produced by the FCC unit, and/or one or more selected product yields from the FCC unit.

At block 404, a gas oil and steam may be supplied to the riser of the FCC unit. In an embodiment, the gas oil may be preheated prior to introduction or being supplied to the riser of the FCC unit. The temperature within the FCC unit (for example, based on the temperature of the steam, gas oil, and/or catalyst) may be within the range of about 650° F. (343° C.) to about 1050° F. (566° C.), or even higher, to perform a cracking operation based on the type of gas oil supplied to the FCC unit. Further, heat from regenerated catalyst may be utilized to increase temperature, as described herein and with further detail below.

At block 406, an amount of plastic may be injected into the riser or at another alternate location of the FCC unit. The plastic may mix with the gas oil and steam. In an embodiment, the plastic may be pre-heated prior to introduction into the FCC unit based on the temperature within the FCC unit.

At block 408 and as noted, the gas oil, plastic, and steam may mix with the catalyst in the riser of the FCC unit. At block 410, the gas oil and the plastic or a portion of plastic may be cracked (for example, higher molecular weight hydrocarbons are converted or cracked to smaller vaporous molecule). Such a cracking operation may cause coke or carbonaceous material to form on the surface of the catalyst thereby forming a coked catalyst. The use of the plastic may reduce such coke formation, although some amount of coke may form. Forming of the coke on the catalyst may reduce the catalytic capability of the catalyst, thus, to utilize the catalyst in further operations or again, the coked catalyst may be passed through a regenerator.

At block 412, the coked catalyst (and, in some embodiments, an uncracked portion of the plastic) may be separated from the hydrocarbon or gas products formed via the cracking operation. Such separation may occur via one or more cyclones included in the reactor of the FCC unit, as will be understood by one skilled in the art. At block 414, the hydrocarbon products formed during cracking may be supplied to an outlet of the FCC unit. At block 416, the conversion and LPG yield of the cracking operation may be determined. An analyzer and/or sensor, in conjunction with a controller or other computing device, may determine the conversion, yield, and selectivity of the FCC unit output. In other words, the hydrocarbon product may be analyzed or characteristics of the hydrocarbon product may be sensed. Based on those characteristics, the conversion, yield, and selectivity may be determined. At block 418, the conversion, yield, and selectivity may be compared to one or more selected thresholds (such as, propylene yield and selectivity and/or plastic precursor yield and selectivity). The selected threshold may be a value (such as an output or yield of a particular feedstock or product) at which the cracking operation is economically feasible. The selected threshold may be a value indicating a maximum or high operating efficiency of the FCC unit. In a further embodiment, the selected threshold may be a range of values.

If the conversion, yield, and selectivity is within the selected threshold, then method 400 may be executed again (or during a cracking operation). If the conversion and LPG yield is not within the selected threshold, then at block 420, the amount of plastic may be adjusted. Further, at block 422, the location of where the plastic or other plastic is injected into the FCC unit may be changed (for example, plastic may be injected into the FCC unit at the same and/or different alternative location of the FCC unit). Such an alternative location may include may include or comprise one or more of injection points separate from the gas oil injection point, at a FCC reactor catalyst bed, at an FCC catalyst stripper, at a nozzle located above or downstream of a gas oil injection point, at a nozzle below or upstream of the gas oil injection point, at the regenerator, and/or at various points where steam is introduced into the FCC unit (for example, the plastic may be injected along with stripping steam, pre-stripping steam, or fluffing steam). In another embodiment, other factors may be considered when adjusting the amount and/or location of plastic injected into the FCC unit. For example, the temperature within the FCC unit, the pressure within the FCC unit, sulfur specifications (for example, including how much sulfur may be in the hydrocarbon products), the type of gas oil being cracked, whether the cracking operation is using all plastic (for example, no gas oil is supplied to the FCC unit), and/or the type of plastic available.

Figure 5:
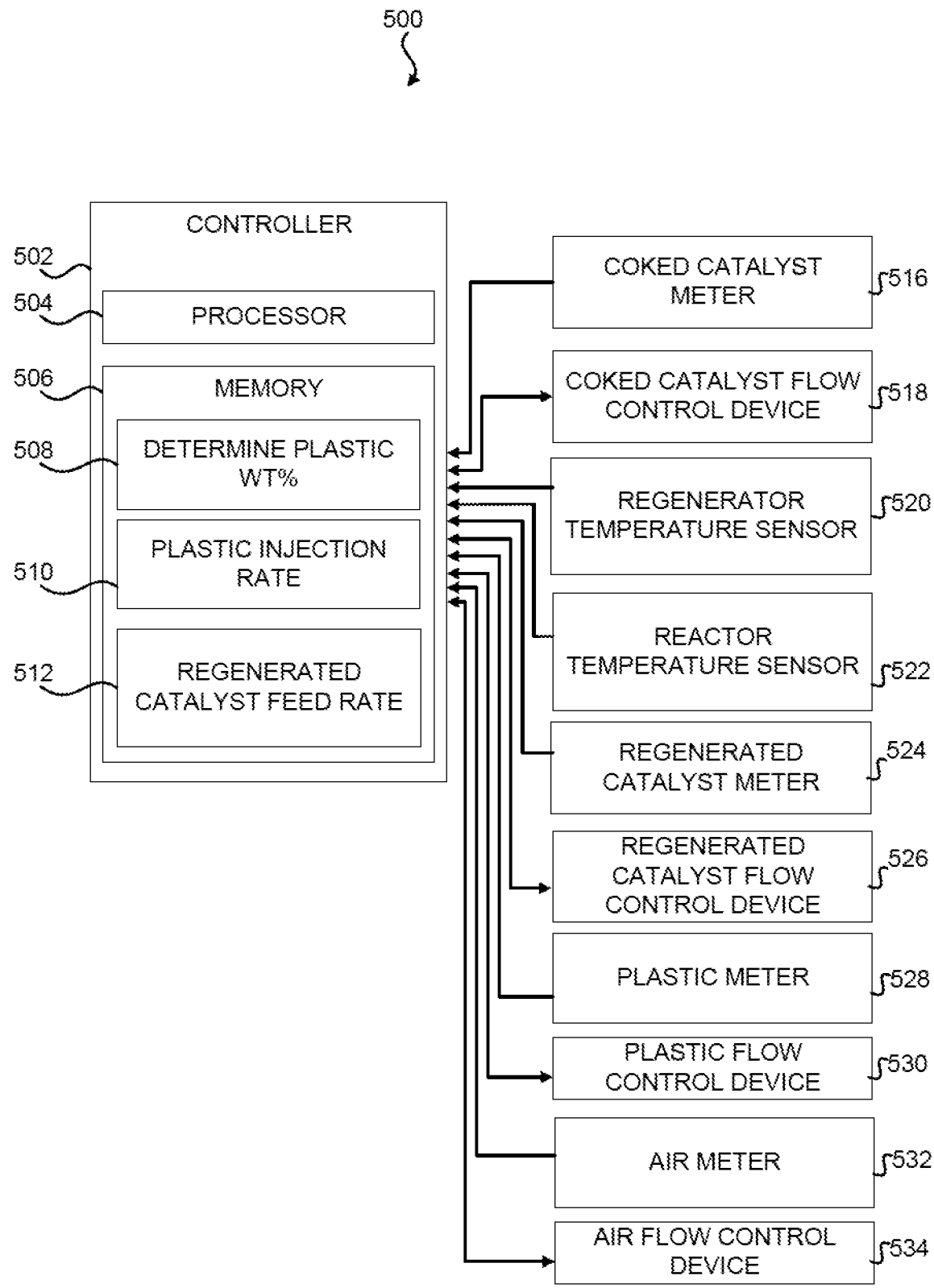
FIG. 5 is a simplified diagram illustrating a control system for managing the processing of hydrocarbons and regeneration of catalyst using plastic, according to an embodiment of the disclosure.

FIG. 5 is a simplified diagram illustrating a control system 500 for managing the processing of hydrocarbons and regeneration of catalyst using biomass-derived pyrolysis oil (also referred to as plastic), according to one or more embodiments disclosed herein. In an example, the control system may include a controller 502 or one or more controllers. Further, the controller 502 may be in signal communication with various other controllers throughout or external to a refinery. The controller 502 may be considered a supervisory controller. In another example, a supervisory controller may include the functionality of controller 502.

Each controller 502 described above and herein may include a machine-readable storage medium (such as, memory 506) and one or more processors (such as, processor 504). As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (such as a hard drive), a solid state drive, any type of storage disc, and the like, or a combination thereof. The memory 506 may store or include instructions executable by the processor 504. As used herein, a "processor" may include, for example one processor or multiple processors included in a single device or distributed across multiple computing devices. The processor 504 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

In an embodiment, the controller 502 may obtain the temperature at various points and/or locations or of materials in the control system 500 or FCC unit. For example, a reactor temperature sensor 522 or probe may provide, in real-time and/or continuously or at regular intervals, a signal to the controller 502 indicative of the temperature within the reactor and/or indicative of temperature of the materials within the reactor. In another example, a regenerator temperature sensor 520 or probe may provide, in real-time and/or continuously or at regular intervals, a signal to the controller 502 indicative of the temperature within the regenerator and/or indicative of temperature of the materials within the reactor. In another embodiment, a plurality of sensors or probes may be positioned throughout the reactor and/or regenerator, thus providing temperatures and/or other characteristics at varying locations of the reactor and/or regenerator. Other temperatures sensors and/or probes may be positioned at varying locations throughout the system, for example, including, but not limited to, at each inlet of the reactor, riser, and/or regenerator; at each outlet of the reactor, riser, and/or regenerator; and/or within a well or stand-pipe configured to store regenerated catalyst. Other sensors may be disposed throughout the control system 500 to measure or indicate various other aspects or characteristics within the system, such as a coked catalyst meter 516 (for example, to indicate a flow rate and/or amount of coked catalyst flowing from the riser or reactor), a regenerated catalyst meter 524 (for example, to indicate a flow rate and/or amount of regenerated catalyst flowing to the riser and/or a well or stand pipe), a plastic meter 528 (for example, to indicate a flow rate and/or amount of plastic flowing to the riser, reactor, and/or regenerator), and/or an air (and/or separate and/or additional oxygen) meter 532 (for example, to indicate a flow rate and/or amount of air (and/or separate and/or additional oxygen) flowing to the regenerator). Other sensors or probes may measure or indicate pressure, composition and/or yield, (for example, the composition and/or yield of the product output from the reactor), and/or other characteristics.

In an example, the sensors or probes positioned and/or disposed throughout the control system 500 may be pressure transducers, flow meters, mass flow meters, Coriolis meters, analyzers, other measurement sensors to determine a density, flow, temperature, composition, yield, or other variable as will be understood by those skilled in the art, or some combination thereof. In such examples, the sensors may measure the density of a fluid or material, the flow of the fluid or material, the temperature of the fluid or material, and/or the pressure within various locations of the system (such as, within the reactor, riser, and/or regenerator). As noted above, the controller 502 may be in signal communication with the sensors, probes, or meters. The controller 502 may receive, poll, and/or request data from the sensors at various points or substantially continuously during a cracking and/or regeneration operation.

In an embodiment, the control system 500 may include one or more different flow control devices. For example, the control system 500 may include a coked catalyst flow control device 518, a regenerated catalyst flow control device 526, a plastic flow control device 530, an air (and/or separate and/or additional oxygen) flow control device 534, and/or other flow control devices to control an amount of material or fluid flowing from one location to another. Each flow control device may include one or more of a pump, a meter (as described herein), a sensor or probe (as described herein), a valve (such as, a control valve, a slide valve, or another valve configured to control an amount of fluid or material flowing therethrough), and/or some combination thereof. In such examples, each component of the flow control device may be in signal communication with the controller 502. The flow control devices may allow for adjustment of the flow of the fluid or material based on various factors received by the controller 502.

The controller 502, according to an embodiment, may include instructions 508 to determine a wt % of plastic in relation to coked catalyst, gas oil or feed, or another material or fluid in the system. In such embodiments, the controller 502 may determine such a value based on a number of factors. For example, if the controller 502 is determining wt % of plastic in relation to gas oil or feed flowing into a riser, then the controller 502 may determine such a value based on the amount of gas oil or feed flowing into the riser and the amount of the plastic injected into the regenerator, stripping zone, and/or a stand-pipe, along with the amount of gas oil or feed. In another example, if the controller 502 is determining wt % of plastic in relation to coked catalyst flowing into the regenerator (such as, when plastic is injected into directly into the regenerator), then the controller 502 may determine such a value based on the amount of coked catalyst flowing into the regenerator and the amount of the plastic injected into the regenerator.

The controller 502, in another embodiment, may include instructions 510 to adjust the plastic injection rate. In an embodiment, to maximize efficiency, reduce cost, and/or utilize an amount of plastic waste, the controller 502 may introduce an amount of plastic to increase the temperature within the regenerator. Initially, the amount of plastic may be greater than 0% to about 2% wt % (or, in some embodiments, even greater) in relation to feed or coked catalyst (based on where the plastic is injected). After such an initial amount is injected and during cracking operations, the amount of plastic may be adjusted to between about 0% to about 2% wt % as noted. The controller 502 may determine whether to increase or decrease the amount of plastic based on the temperature within the reactor, the current wt % of the plastic, the plastic flow rate, the flow rate of the coked catalyst flowing into the regenerator, the temperature of the coked catalyst, the temperature within the regenerator, and/or the yield and/or composition of products produced via the reactors, among other factors. For example, the controller 502 may, in response to the temperature within the regenerator and/or temperature of the regenerated catalyst being less than a selected temperature, increase the amount of plastic directly injected into the regenerator. Such an increase may occur based on the controller 502 sending a signal indicating an increase in amount of plastic (for example, a new plastic flow rate) to a plastic flow control device 530. In yet another example, the controller 502 may decrease the amount of plastic injected into the regenerator or riser if the temperature of the reactor is above a selected temperature. In an embodiment, the controller 502, in addition to adjusting or determining an adjustment to plastic injection rate, may determine an amount of and/or injection rate of oxygen and/or air. For example, based on the temperature within the regenerator, the controller 502 may adjust an amount of oxygen to inject directly into the regenerator, an amount of additional oxygen to mix with air supplied to the regenerator, and/or adjust the flow rate of air and/or oxygen supplied to the regenerator. In another example, if the yield of a specified product is below a selected threshold, then the amount of plastic injected and/or the location of the injection may be adjusted or updated.

The controller 502 may additionally include instructions 512 to determine a rate and/or amount of regenerated catalyst to supply to a riser of an FCC unit to mix with additional and/or new gas oil and/or steam. In an embodiment, the regenerator of a FCC unit may regenerate catalyst, as described herein. In other words, the regenerator may enable coked or spent catalyst to perform further catalytic functions based on combustion of the coke deposited on the coked or spent catalyst. Prior to the regenerated catalyst being reintroduced into or supplied to the riser, the controller 502 may determine the temperature within the riser and/or the reactor, the temperature within the regenerator, the temperature of the regenerated catalyst, the temperature of fresh catalyst, the temperature of the gas oil or feed, the amount of regenerated catalyst in a well or stand-pipe, and/or the yield and/or composition of products produced via the reactors, among other factors. Based on these factors the amount of regenerated catalyst being mixed in the riser may be varied. For example, if the temperature within the reactor and/or riser (or, in other embodiments, various other locations within a FCC unit) is less than a preselected temperature, then the controller may increase the amount of regenerated catalyst flowing to the riser. As the amount of regenerated catalyst is increased, the temperature within the riser may increase, thus the gas oil or feed and the steam may not utilize additional pre-heating thereby saving energy, reducing cost, and/or reducing emissions.

Such an increase or decrease of the flow of regenerated catalyst may be controlled via the regenerated catalyst flow control device 527. The controller 502 may send signals indicating adjustment of flow rate of the regenerated catalyst to the regenerated catalyst flow control device 527.

In another embodiment, the controller 502 may control flow rates of other materials or fluids, such as the amount of air (and/or separate and/or additional oxygen) introduced into the regenerator (for example, via the air (and/or separate and/or additional oxygen) flow control device 534), the amount of coked catalyst flowing into the regenerator (such as, via the coked catalyst flow control device 518), the amount of plastic flowing into the regenerator or riser (such as, via the plastic flow control device 530), and/or the amount of gas oil or feed flowing into the riser. Other factors, as noted, may be utilized in adjusting such flow rates, such as pressure, density, and/or temperature, among other factors (such as, for example, capacity of the reactor, riser, and/or well or stand-pipe).

In another embodiment, the controller 502 may comprise or include a first set of one or more inputs in signal communication with one or more sensors (such as, the coked catalyst meter 516, the regenerator temperature sensor 520, the reactor temperature sensor 522, the regenerated catalyst meter 524, the plastic meter 528, the air (and/or separate and/or additional oxygen) meter 532, and/or a riser temperature sensor). The one or more sensors may be positioned within or proximate to one or more of a regenerator, a riser of an FCC unit, a reactor of the FCC unit, and/or other conduits or pipe and/or inlets and/or outlets associated with the regenerator, the riser of the FCC unit, and/or the reactor of the FCC unit. The controller 502 may receive signals from the one or more sensors indicative of a characteristic. The characteristic may comprise one or more of temperature, pressure, flow rate, and/or composition. The controller 502 may comprise a first set of one or more inputs/outputs in signal communication with one or more flow control devices (such as, the coked catalyst flow control device 518, the regenerated catalyst flow control device 526, the plastic flow control device 530, and/or the air (and/or separate and/or additional oxygen) flow control device 534) positioned on one or more inlets or outlets associated with the regenerator, the riser of the FCC unit, and/or the reactor of the FCC unit. The controller 502 may, in response to the characteristic from one of the one or more sensors being less than or greater than a preselected threshold (for example, a temperature, pressure, or flow rate range), adjust the one or more flow control devices via a signal indicating a new flow rate for the flow control device to adjust to.

The chemistry, hydrogen transfer activity, heat balance, catalytic coke, catalyst formulations and yields presented are all directionally correct. Economic evaluations for the profitability of a shift towards a more gasoline/distillate operation with higher C4+ olefinicities is dependent upon specific economics/pricing along with the financial incentives for the reduction in COx, NOx and SOx emissions. Alternate operating modes (maintaining high catalyst activity, among other modes) may be more advantageous due to increase in liquid volume yield of products associated with coke yield reduction. The results of prophetical or predictive determinations or calculations of parameters or results of the operations described herein are listed in table 1 below.

TABLE 1

| FEED | HDT VGO | Case A | Case B | Case C |
| --- | --- | --- | --- | --- |
| RX TEMP | 960 | 960 | 960 | 960 |
| INLET TEMP | 625 | 625 | 625 | 625 |
| REGEN TEMP | 1245 | 1189 | 1240 | 1283 |
| RX PRESSURE | 22.5 | 18 | 18 | 18 |
| CAT/OIL | 6.3 | 7.98 | 6.51 | 5.64 |
| DELTA COKE | 0.6 | 0.47 | 0.47 | 0.47 |
| HT REX | 138 | 145 | 145 | 145 |
| COKE YIELD | 3.76 | 3.75 | 3.06 | 2.65 |
| MAT | 78 | 68 | 68 | 68 |
| CONV LV % | 81.27 | | 76 | |
| TOTAL LV % | 115 | | 114.2 | |
| C4+/C4'S | 0.45 | | 0.56 | |
| GASOLINE LV % | 68.2 | | 70.5 | |
| G + D LV % | 84 | | 89.1 | |
| CATALYST | HREY | USY | USY | USY |
| PLASTIC DUTY MMBTU/HR | 0.0 | 0.0 | 50.0 | 80.0 |

Table 1 illustrates the base case operation for a 40,000 Barrels per stream day (BPSD) operation with the objective of operating a maximum Gasoline+Distillate operation with higher C4+ olefinicities. Case A estimates the initial impact on the unit heat balance when reformulating the catalyst to a lower activity, 68 micro activity test (MAT) ultrastable Y (USY), and dropping the RX pressure to 18 pounds per square inch gauge (psig). In case A, the delta coke and regenerator temperature drop significantly, while cat/oil is higher, as is the heat of reaction. However, the coke yield and base case conversion remain almost constant. FCC unit operation may be difficult due to lower bed temperatures and poor regenerator kinetics. Cases B and C illustrate the estimated benefits of the addition of appropriate plastic in terms of British thermal units per hour (BTU/hr) input in relation to the overall heat balance and, particularly for Case B, the effect on conversion, product yields, and olefinicities.

Injection of the plastic provides additional enthalpy control for reducing catalytic coke yield, regenerator temperature, and cat/oils. For Case B the catalytic coke yield has now been reduced to 3.06 Wt % and regenerator temperatures increased to about 1240° F. (about 671° C.). Conversion is shown to decline to 76 Vol % with significantly higher yields of gasoline and distillate. The lower pressure, lower activity USY with similar cat/oil, may significantly drop the hydrogen transfer activity and generate higher C4 olefinicities and coke selectivity, but with higher heats of reaction. Case C further illustrates the control afforded with supplemental duty via plastic addition in further reducing the catalytic coke, cracking severity along with additional flexibility in regenerator operating conditions, and product yields.

For Case B, the overall unit enthalpy balance is now equivalent to the 3.06 wt % coke make plus the duty provided by addition of plastic (50 MMBTU/hr). Given typical plastic heat of combustion of 20,000 BTU/lb, plastic consumption rates (and as a result waste reduction rates) can be significant, for example upwards of 30 tons per day for Case B (50 MMBTU/hr).

Specific compositions, methods, or systems are intended to be only illustrative of the embodiments disclosed by this specification. Variation on these systems, methods, or embodiments are readily apparent to a person of skill in the art based upon the teachings of this specification and are therefore intended to be included as part of the disclosure herein.

The present application claims priority to and the benefit of U.S. Provisional Application No. 63/378,981, filed Oct. 10, 2022, titled "METHODS AND SYSTEMS FOR ENHANCING PROCESSING OF HYDROCARBONS IN A FLUID CATALYTIC CRACKING UNIT USING A RENEWABLE ADDITIVE," U.S. Provisional Application No. 63/495,761, filed Apr. 12, 2023, titled "METHODS AND SYSTEMS FOR ENHANCING PROCESSING OF HYDROCARBONS IN A FLUID CATALYTIC CRACKING UNIT USING PLASTIC," and U.S. Provisional Application No. 63/495,748, filed Apr. 12, 2023, titled "METHODS AND SYSTEMS FOR ENHANCING PROCESSING OF HYDROCARBONS IN A FLUID CATALYTIC CRACKING UNIT USING A RENEWABLE ADDITIVE," the disclosures of which are incorporated herein by reference in their entirety. This application is also a continuation-in-part of U.S. Non-Provisional application Ser. No. 18/045,314, filed Oct. 10, 2022, titled "METHODS AND SYSTEMS FOR ENHANCING PROCESSING OF HYDROCARBONS IN A FLUID CATALYTIC CRACKING UNIT USING A RENEWABLE ADDITIVE," which claims priority to and the benefit of U.S. Provisional Application No. 63/262,342, filed Oct. 10, 2021, titled "METHODS AND SYSTEMS FOR ENHANCING PROCESSING OF HYDROCARBONS IN A FLUID CATALYTIC CRACKING UNIT USING A RENEWABLE ADDITIVE," the disclosures of which are incorporated herein by reference in their entirety.

In the drawings and specification, several embodiments of systems and methods to activate indicators have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

The invention claimed is:

1. A method of processing a gas oil in a fluid catalytic cracking (FCC) unit, the method comprising:
   introducing steam and the gas oil into a riser of an FCC unit;
   mixing the gas oil and the steam with an FCC catalyst fluidized in the riser;
   cracking the gas oil into one or more FCC hydrocarbon products in the FCC unit, thereby to cause one or more surfaces of the FCC catalyst to be at least partially covered by coke so as to define a coked FCC catalyst;
   separating the coked FCC catalyst from the one or more FCC hydrocarbon products in the FCC unit;
   passing the coked FCC catalyst to a regenerator;
   introducing at least oxygen and a fluidized plastic into the regenerator;
   combusting a combination of the fluidized plastic and the coke from the coked FCC catalyst in the regenerator, thereby to oxidize via the oxygen and produce a regenerated FCC catalyst and a flue gas; and supplying the regenerated FCC catalyst from the regenerator to the riser of the FCC unit.

2. The method of claim 1, wherein combusting the fluidized plastic in the regenerator allows temperature inside the regenerator to be increased without adversely affecting one or more properties of the one or more FCC hydrocarbon products.

3. The method of claim 1, wherein combusting the fluidized plastic in the regenerator increases temperature inside the regenerator by at least about 5° F. while maintaining one or more of (a) sulfur specifications of the one or more FCC hydrocarbon products, or (b) specification of gasoline in the one or more FCC hydrocarbon products below a pre-selected value.

4. The method of claim 1, further comprising introducing the fluidized plastic at one or more of (a) proximate to a bottom portion of the regenerator, or (b) a bed of catalyst positioned inside the regenerator.

5. The method of claim 1, wherein the fluidized plastic comprises a density of about 0.8 g/cm$^3$ to about 1.0 g/cm$^3$, wherein the fluidized plastic comprises one or more of polypropylene, low-density polyethylene, or high-density polyethylene, wherein the fluidized plastic comprises granules milled to one of a size of about the FCC catalyst or about 1 micrometer to about 350 micrometers, and wherein the fluidized plastic comprises a plastic substantially free from contaminates.

6. The method of claim 1, further comprising:
determining, via a controller, a temperature within the regenerator; and
in response to a determination that the temperature within the regenerator is less than a preselected temperature, adjusting, via a flow control device associated with the fluidized plastic and in communication with the controller, an amount of the fluidized plastic introduced into the regenerator, thereby to adjust the temperature within the regenerator.

7. A method of processing a gas oil in a fluid catalytic cracking (FCC) unit, the method comprising:
introducing steam and the gas oil into a riser of an FCC unit;
mixing the gas oil and the steam with an FCC catalyst fluidized in the riser;
injecting an amount of fluidized plastic into one or more locations of the FCC unit at one or more time periods to one or more of (a) balance heat within the FCC unit, or (b) optimize a one or more FCC hydrocarbon products yield, the fluidized plastic comprising a plurality of granules, each granule having a size about a size of the FCC catalyst;
cracking the gas oil into the one or more FCC hydrocarbon products in the FCC unit, thereby to cause one or more surfaces of the FCC catalyst to be at least partially covered by coke so as to define a coked FCC catalyst;
separating the coked FCC catalyst from the one or more FCC hydrocarbon products the FCC unit; and
passing the FCC hydrocarbon products to an outlet.

8. The method of claim 7, wherein injection of the fluidized plastic into the one or more locations of the FCC unit comprises injection of the fluidized plastic at one or more of: (a) a regenerator, (b) the riser, (c) an FCC reactor catalyst bed, (d) an FCC catalyst stripper, (e) at a nozzle located above a gas oil injection point, or (f) at a nozzle located below the gas oil injection point, such that adjustment of an amount of fluidized plastic injected at any one of the one or more locations changes one or more of (a) a temperature within the FCC unit, or (b) yield selectivity.

9. The method of claim 8, wherein injection of the fluidized plastic increases a temperature within the regenerator and, thereby, increases a temperature of a regenerated FCC catalyst to increase delta coke.

10. The method of claim 8, wherein oxidation of the fluidized plastic in the regenerator increases temperature inside the regenerator by at least about 5° F. while maintaining a sulfur level in each of the plurality of FCC products, based on one or more specifications of the plurality of FCC products produced by processing the gas oil, below a pre-selected value.

11. The method of claim 8, wherein the fluidized plastic is introduced in an amount less than about 2 volume percent of the gas oil introduced into the riser.

12. The method of claim 8, wherein the fluidized plastic is introduced in an amount ranging from about 1 to about 2 mass percent of the gas oil introduced into the riser.

13. The method of claim 7, wherein injection of the fluidized plastic occurs via an existing inlet of the FCC unit, and wherein the existing inlet comprises one or more of a pre-stripping steam inlet, a stripping steam inlet, or a fluffing steam inlet.

14. The method of claim 7, wherein the fluidized plastic comprises a density of about 0.8 g/cm$^3$ to about 1.0 g/cm$^3$, and wherein the fluidized plastic comprises one or more of polypropylene, low-density polyethylene, or high-density polyethylene.

15. The method of claim 7, wherein injection of the fluidized plastic into the one or more locations of the FCC unit generates selective yields for production of specified hydrocarbon products, and wherein the selective yields for production of specified hydrocarbon products comprises one or more of a reduction of hydrogen generation, an increase in C4 olefinicities, or a reduction in coke yield.

16. The method of claim 15, wherein the specified hydrocarbon products include one or more of propylene, light olefins, transportation fuel, or other petrochemical feedstock.

17. The method of claim 7, wherein the one or more locations of the FCC unit comprises a regenerator, and further comprising:
passing the coked FCC catalyst to the regenerator;
introducing at least oxygen and the fluidized plastic into the regenerator;
combusting a combination of the fluidized plastic and the coke from the coked FCC catalyst in the regenerator, to produce a regenerated FCC catalyst and a flue gas; and
supplying the regenerated FCC catalyst from the regenerator to the riser of the FCC unit.

18. The method of claim 7, further comprising:
determining, via a controller responsive to a sensor or analyzer positioned at one or more of (a) within the FCC unit, (b) at an outlet of the FCC unit, or (c) in fluid communication with the outlet of the FCC unit, one or more of a conversion, yield, or selectivity; and
in response to a determination that one or more of the conversion, the yield, or the selectivity is less than a preselected amount, adjusting the amount of the fluidized plastic injected into the FCC unit at one or more alternative locations.

19. A method of processing a gas oil in a fluid catalytic cracking (FCC) unit, the method comprising:
passing a coked FCC catalyst from a cyclone of the FCC unit to a regenerator;
introducing at least oxygen and a fluidized plastic into the regenerator;

combusting a combination of the fluidized plastic and a coke from the coked FCC catalyst in the regenerator, thereby to oxidize via the oxygen and produce a regenerated FCC catalyst and a flue gas; and supplying the regenerated FCC catalyst from the regenerator to a riser of the FCC unit to crack the gas oil supplied to the riser of the FCC unit.

20. The method of claim 19, wherein the fluidized plastic comprises a density of about 0.8 g/cm$^3$ to about 1.0 g/cm$^3$, wherein the fluidized plastic comprises one or more of polypropylene, low-density polyethylene, or high-density polyethylene, wherein the fluidized plastic comprises granules milled to one of a size of about a FCC catalyst or about 1 micrometer to about 350 micrometers, and wherein the fluidized plastic comprises a plastic substantially free from contaminates.

21. The method of claim 19, wherein introduction of the fluidized plastic into the regenerator occurs at one or more inlets of the regenerator.

22. The method of claim 19, further comprising:
determining a temperature within the regenerator;
determining a temperature within the riser of the FCC unit; and
in response to a determination that one or more of (a) the temperature within the regenerator, or (b) the temperature within the riser of the FCC unit exceeds or falls below a corresponding threshold range, one or more of:
adjusting an amount of fluidized plastic introduced into the regenerator,
adjusting an amount of regenerated FCC catalyst supplied to the riser, or
introducing a second amount of fluidized plastic into one or more inlets of a reactor of the FCC unit.

23. The method of claim 19, further comprising:
determining a yield of a specified hydrocarbon product produced via the FCC unit; and
in response to a determination that the yield falls below a selected threshold, one or more:
adjusting an amount of fluidized plastic introduced into the regenerator,
adjusting an amount of regenerated FCC catalyst supplied to the riser, or
introducing a second amount of fluidized plastic into one or more locations of a reactor of the FCC unit.

24. The method of claim 19, further comprising:
prior to introduction of the fluidized plastic into the regenerator, milling the plastic to a selected size, and wherein the selected size comprises one or more of a size about a size of FCC catalyst or about 1 micrometer to about 350 micrometer.

25. The method of claim 19, wherein the fluidized plastic comprises plastic granules milled from one or more of (a) waste, or (b) post-consumer plastic waste.

26. A system for processing a gas oil in a fluid catalytic cracking (FCC) unit, the system comprising:
a riser having a first inlet to receive a gas oil stream, a second inlet in fluid communication with steam and a first portion of fluidized plastic, and a third inlet to receive an FCC catalyst, the riser configured to be operated under cracking reaction pressure and temperature conditions to facilitate mixing and catalytic cracking of the gas oil stream in presence of the steam and the FCC catalyst, thereby to form a plurality of FCC products and coked FCC catalyst;

a reactor having (i) an FCC reaction zone in fluid communication with an upper portion of the riser and configured to continue to crack the gas oil stream in presence of the steam and the FCC catalyst, thereby to generate the plurality of FCC products and more of the coked FCC catalyst, (ii) a separation zone to separate the plurality of FCC products from the coked FCC catalyst, and (iii) a first outlet stream to transport the plurality of FCC products to a fractionation zone, thereby to separate the plurality of FCC products into one or more of propylene, isobutene, butylenes, gasoline, distillate, diesel fuel, heating oil, slurry oil, or wet gas; and a regenerator connected to and in fluid communication with a second outlet stream of the reactor and having a fourth inlet stream to receive at least oxygen, a fifth inlet stream in fluid communication with a second portion of fluidized plastic, a third outlet stream being connected to and in fluid communication with the third inlet of the riser to supply a regenerated FCC catalyst to the riser, and a fourth outlet stream positioned to discharge a flue gas containing one or more of nitrogen, nitrogen oxides, carbon dioxide, carbon monoxide, or water vapor, the regenerator operated to oxidize coke on the coked FCC catalyst, the first portion of fluidized plastic, and the second portion of fluidized plastic, thereby to produce the regenerated FCC catalyst and the flue gas.

27. The system of claim 26, further comprising a stripping zone connected to and in fluid communication with the second outlet stream and the regenerator, the stripping zone operated to remove adsorbed and entrained hydrocarbons from the coked FCC catalyst prior to supplying the coked FCC catalyst to the regenerator.

28. The system of claim 26, further comprising:
a bottom portion of the regenerator; and
a bed of the coked FCC catalyst positioned inside the regenerator, and
wherein the second portion of fluidized plastic is introduced proximate to or into one or more of the bottom portion of the regenerator or the bed of the coked FCC catalyst positioned inside the regenerator.

29. The system of claim 26, further comprising:
a temperature sensor positioned within the regenerator to measure a temperature within the regenerator; and
a controller in signal communication with the temperature sensor, the controller configured to adjust an amount of the fluidize plastic supplied to the regenerator, in response to a determination that the temperature within the regenerator is less than a preselected temperature.

* * * * *